United States Patent
Oshikiri et al.

[11] Patent Number: 5,592,334
[45] Date of Patent: Jan. 7, 1997

[54] ZOOM LENS SYSTEM

[75] Inventors: Minoru Oshikiri, Akigawa; Toshihide Nozawa, Hachioji, both of Japan

[73] Assignee: Olympus Optical Co., Ltd., Tokyo, Japan

[21] Appl. No.: 217,658

[22] Filed: Mar. 25, 1994

[30] Foreign Application Priority Data

Mar. 26, 1993 [JP] Japan .................... 5-068006

[51] Int. Cl.$^6$ .................... G02B 15/14
[52] U.S. Cl. .................... 359/689; 359/684; 359/791
[58] Field of Search .................... 359/689, 695, 359/684, 689, 791, 716

[56] References Cited

U.S. PATENT DOCUMENTS

| | | | |
|---|---|---|---|
| 4,978,204 | 12/1990 | Ito | 359/689 |
| 5,172,273 | 12/1992 | Yamanashi . | |
| 5,175,648 | 12/1992 | Mori . | |
| 5,343,329 | 8/1994 | Ito | 359/689 |
| 5,379,154 | 1/1995 | Shibayama et al. | 359/689 |
| 5,424,870 | 6/1995 | Hashimura et al. | 359/689 |

FOREIGN PATENT DOCUMENTS

| | | |
|---|---|---|
| 1204013 | 8/1989 | Japan . |
| 210307 | 1/1990 | Japan . |
| 273211 | 3/1990 | Japan . |
| 4404 | 1/1992 | Japan . |
| 4118613 | 4/1992 | Japan . |
| 4338910 | 11/1992 | Japan . |

*Primary Examiner*—David C. Nelms
*Assistant Examiner*—Son Mai
*Attorney, Agent, or Firm*—Cushman, Darby & Cushman IP Group of Pillsbury Madison & Sutro LLP

[57] ABSTRACT

A zoom lens system which enables favorable image quality to be obtained even when it is focused on an object at a short distance. The zoom lens system has a 1-st lens unit (G1) of positive power, a 2-nd lens unit (G2) of positive power, and a 3-rd lens unit (G3) of negative power. Zooming from the wide end toward the tele end is effected by increasing the spacing between the 1-st lens unit (G1) and the 2-nd lens unit (G2) while reducing the spacing between the 2-nd lens unit (G2) and the 3-rd lens unit (G3). The 2-nd lens unit (G2) of positive power is composed of a negative sub-lens unit (G2N) and a positive sub-lens unit (G2P), and an aperture stop is disposed between the 1-st lens unit (G1) and the 2-nd lens unit (G2) (as shown by S') or between the negative sub-lens unit (G2N) and the positive sub-lens unit (G2P) (as shown by S). When focusing is to be effected on an object at a short distance at, at least, the wide end, the negative sub-lens unit (G2N) and the positive sub-lens unit (G2P) are simultaneously moved toward the object side in parallel to the optical axis with the spacing therebetween gradually enlarged.

12 Claims, 13 Drawing Sheets

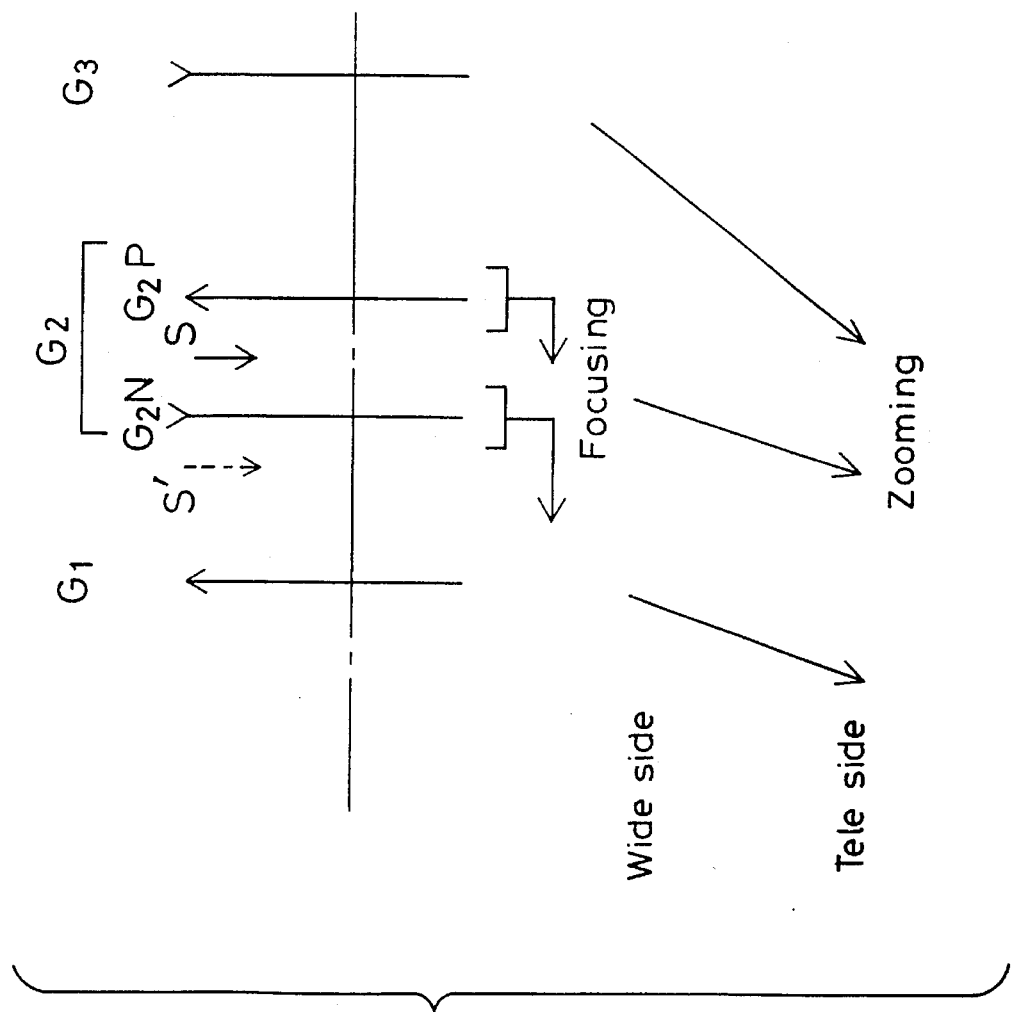

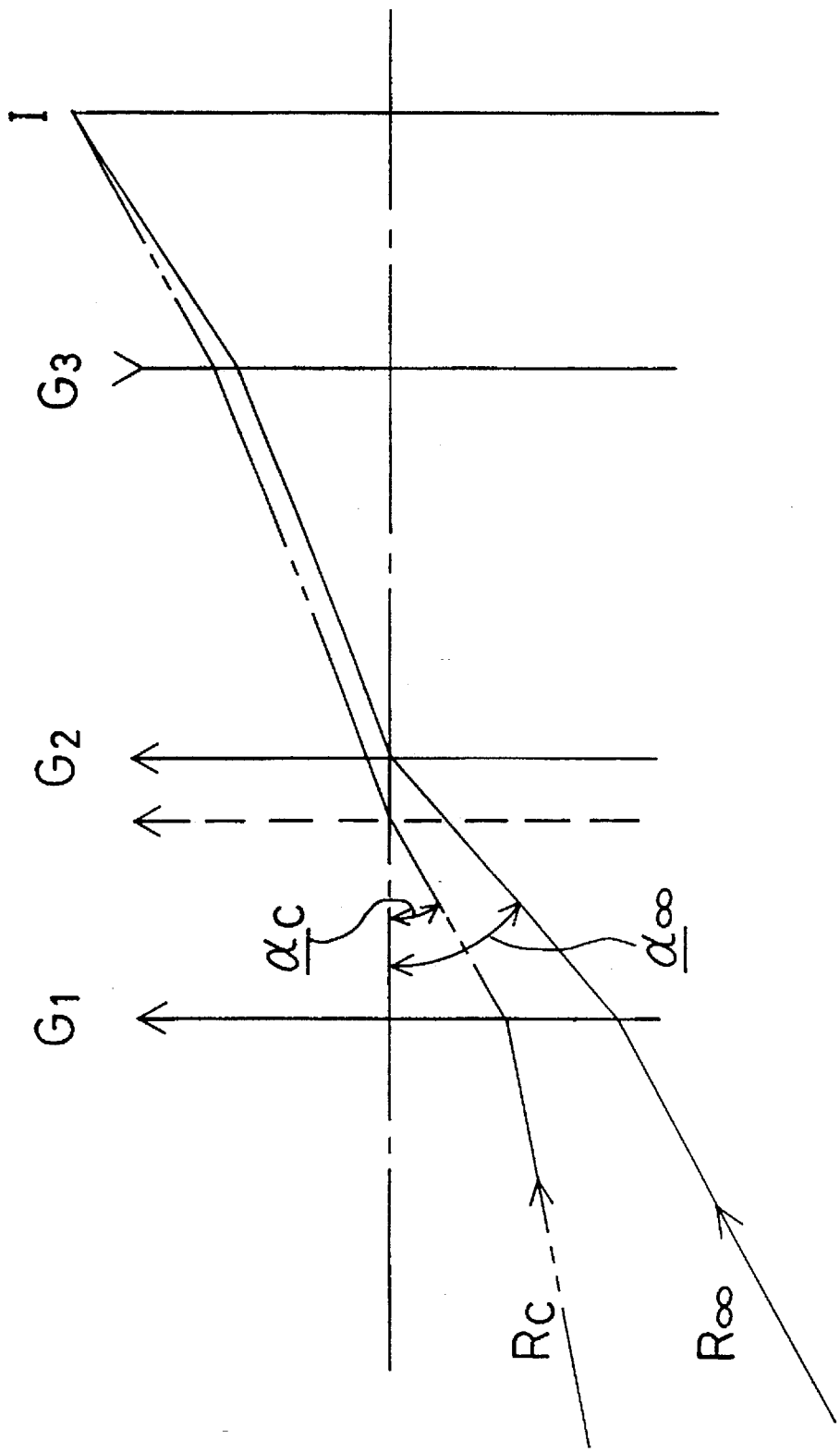

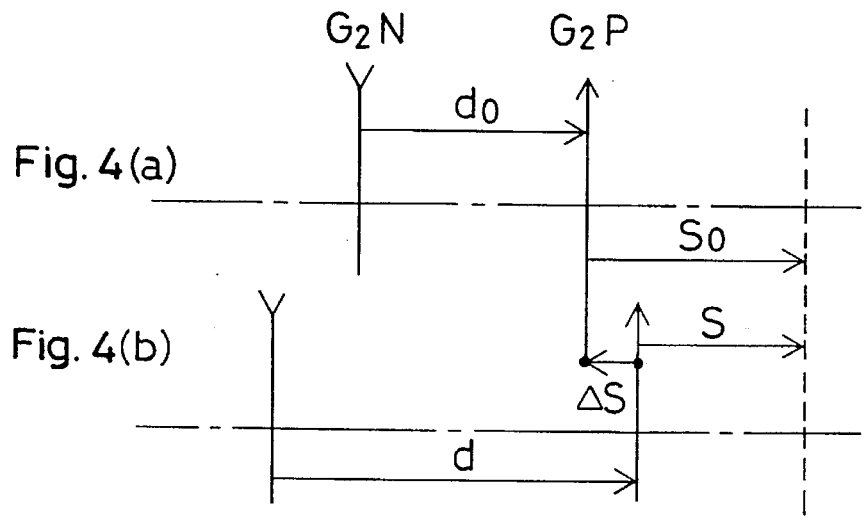
Fig. 4(a)
Fig. 4(b)
$$\begin{pmatrix} \Delta d = d - d_0 \\ \Delta S = S - S_0 \end{pmatrix}$$
FIG. 5
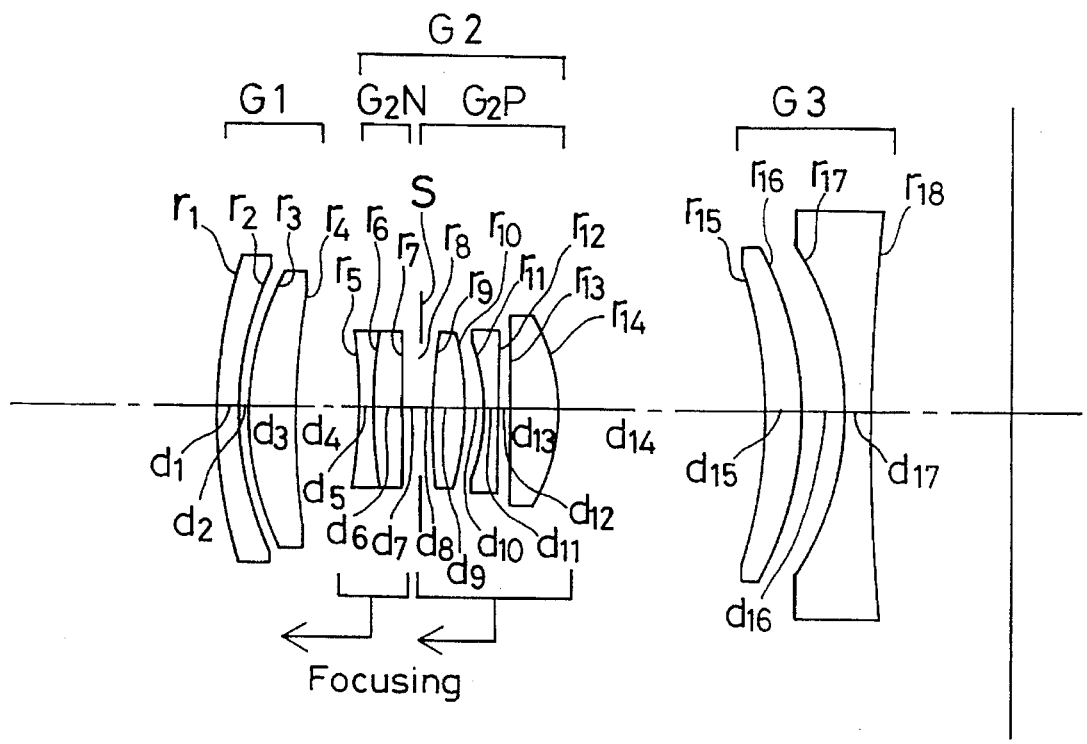

ZOOM LENS SYSTEM

BACKGROUND OF THE INVENTION

The present invention relates to a zoom lens system for use with a camera. More particularly, the present invention relates to a focusing method for a zoom lens system of a still camera.

Conventional focusing methods for zoom lens systems include a front focusing method and an inner focusing method, in which one of zoom lens units is moved for focusing. With these known focusing methods, however, there is a considerably large difference between aberration produced at a short object distance and aberration at infinity. Therefore, when the conventional focusing methods are used for close-up (macro photography), which is required for camera lenses these days, it is extremely difficult to obtain favorable image quality.

In the meantime, there have heretofore been focusing methods known as "floating system", such as a method wherein an aberration variation at a short object distance is corrected by moving two or more of zoom lens units independently of each other, and a method wherein one or a plurality of lenses in zoom lens units are moved independently to make such aberration variation correction. Examples of conventional floating systems include Japanese Patent Application Laid-Open (KOKAI) Nos. 1-204013 (1989), 2-10307 (1990), 4-338910 (1992), 4-406 (1992), 4-118613 (1992), and 2-73211 (1990).

These conventional floating systems suffer, however, from problems as stated below.

Japanese Patent Application Laid-Open (KOKAI) Nos. 1-204013 and 4-338910 are capable of suppressing the aberration variation at a short object distance to a certain extent but still insufficient to satisfactorily minimize the aberration variation.

In Japanese Patent Application Laid-Open (KOKAI) No. 2-10307, the variation of the image surface is favorably corrected, but the variation of spherical aberration at the tele end is unfavorably large because the first lens unit on the object side is used for floating.

In Japanese Patent Application Laid-Open (KOKAI) Nos. 4-406 and 4-118613, the first lens unit on the object side or the final lens unit on the image side is used for floating. Accordingly, the size of the lens to be moved is large, and hence the load on a mechanism for moving the lens increases, resulting in an increase in the overall size of the camera.

Japanese Patent Application Laid-Open (KOKAI) No. 2-73211 is similar in zoom lens type to the present invention, which will be described later. However, an aperture stop is disposed between the 2-nd and 3-rd lens units. Accordingly, when the aberration variation is suppressed by controlling the height of off-axis rays in a floating manner, as described later, the change of the height of off-axis rays caused by floating is small, so that the aberration variation cannot satisfactorily be suppressed. Particularly, the aberration correction effect at the wide end, where the depth of focus is shallow, is disadvantageously weak.

SUMMARY OF THE INVENTION

In view of the above-described problems of the conventional techniques, it is an object of the present invention to provide a zoom lens system which enables favorable image quality to be obtained even when it is focused on an object at a short distance.

To attain the above-described object, the present invention provides a zoom lens system comprising, in order from the object side, a 1-st lens unit of positive power, a 2-nd lens unit of positive power, and a 3-rd lens unit of negative power, wherein zooming from the wide end toward the tele end is effected by increasing the spacing between the 1-st and 2-nd lens units while reducing the spacing between the 2-nd and 3-rd lens units. The 2-nd lens unit of positive power is composed, in order from the object side, of a sub-lens unit of negative power, and a sub-lens unit of positive power. When focusing is to be effected on an object at a short distance at, at least, the wide end, the sub-lens units of the 2-nd lens unit are simultaneously moved toward the object side in parallel to an optical axis with the spacing between the sub-lens units gradually enlarged. Further, the zoom lens system satisfies the following conditions (1) and (2):

$$-(1+4\phi_1/\phi_2)<\phi_{2N}/\phi_2 \times \phi_{2P}/\phi_2 \quad (1)$$

$$0.8<|\phi_3/\phi_W|<2.0 \quad (2)$$

where $\phi_1$: the power of the 1-st lens unit;

$\phi_2$: the power of the 2-nd lens unit;

$\phi_3$: the power of the 3-rd lens unit;

$\phi_{2N}$: the power of the negative sub-lens unit in the 2-nd lens unit;

$\phi_{2P}$: the power of the positive sub-lens unit in the 2-nd lens unit; and $\phi_W$: the reciprocal of the focal length of the entire system at the wide end.

During focusing, an aperture stop may move independently of the negative sub-lens unit in the 2-nd lens unit. In such a case, it is preferable to satisfy the following condition (3):

$$0.8<f_W \Sigma^{G2N}_i (N_i'-N_i)/|r_i|<2.0 \quad (3)$$

where $\Sigma^{G2N}_i$: summation in the negative sub-lens unit of the 2-nd lens unit;

$f_W$: the focal length of the entire zoom lens system at the wide end;

$r_i$: the radius of curvature of the i-th lens surface from the object side in the negative sub-lens unit of the 2-nd lens unit;

$N_i$: the refractive index at the object side of the i-th lens surface from the object side in the negative sub-lens unit of the 2-nd lens unit; and $N_i'$: the refractive index at the image side of the i-th lens surface from the object side in the negative sub-lens unit of the 2-nd lens unit.

During focusing, the aperture stop may move together with the negative sub-lens unit in the 2-nd lens unit as one unit. In such a case, it is preferable to satisfy the following condition (4):

$$-3.0<f_W \Sigma^{G2P}_j (N_j'-N_j)/|r_j|<-0.3 \quad (4)$$

where $\Sigma^{G2P}_j$: summation in the positive sub-lens unit of the 2-nd lens unit;

$f_W$: the focal length of the entire zoom lens system at the wide end;

$r_j$: the radius of curvature of the j-th lens surface from the object side in the positive sub-lens unit of the 2-nd lens unit;

$N_j$: the refractive index at the object side of the j-th lens surface from the object side in the positive sub-lens unit of the 2-nd lens unit; and $N_j'$: the refractive index at the image side of the j-th lens surface from the object side in the positive sub-lens unit of the 2-nd lens unit.

Further, it is preferable to use at least one aspherical surface in the 2-nd lens unit.

It is preferable to use at least one aspherical surface in the positive sub-lens unit of the 2-nd lens unit. In such a case, it is preferable to use at least one aspherical surface that satisfies the following condition (5) in the positive sub-lens unit of the 2-nd lens unit:
where N: the refractive index at the object side of the aspherical surface in the positive sub-lens unit of the 2-nd lens unit;

N': the refractive index at the image side of the aspherical surface in the positive sub-lens unit of the 2-nd lens unit; and E: the coefficient of the quartic term when the aspherical surface is expressed by $$Z=h^2/\{R_0+R_0[1-P(h/R_0)^2]^{1/2}\}+Eh^4+Fh^6+Gh^8+Hh^{10} \quad (I)$$

(where Z represents the configuration of an aspherical surface having a vertex of curvature radius $R_0$ at a point at distance h from the optical axis).

In addition, the present invention provides a zoom lens system including, in order from the object side, a 1-st lens unit having positive power as a whole, a 2-nd lens unit having a negative sub-lens unit disposed on the image side of the 1-st lens unit with an aperture stop interposed therebetween, and a positive sub-lens unit disposed on the image side of the negative sub-lens unit, the 2-nd lens unit having positive power as a whole, and a 3-rd lens unit disposed on the image side of the 2-nd lens unit and having negative power as a whole. During zooming from the wide end toward the tele end, the spacing between the 1-st and 2-nd lens units is increased, while the spacing between the negative and positive sub-lens units in the 2-nd lens unit is held constant, and the spacing between the 2-nd and 3-rd lens units is reduced. During focusing from infinity to a short object distance at, at least, the wide end, the negative and positive sub-lens units in the 2-nd lens unit are moved toward the object side with the spacing therebetween gradually enlarged.

In addition, the present invention provides a zoom lens system including, in order from the object side, a 1-st lens unit having positive power as a whole, a 2-nd lens unit having a negative sub-lens unit disposed on the image side of the 1-st lens unit, and a positive sub-lens unit disposed on the image side of the negative sub-lens unit with an aperture stop interposed therebetween, the 2-nd lens unit having positive power as a whole, and a 3-rd lens unit disposed on the image side of the 2-nd lens unit and having negative power as a whole. During zooming from the wide end toward the tele end, the spacing between the 1-st and 2-nd lens units is increased, while the spacing between the negative and positive sub-lens units in the 2-nd lens unit is held constant, and the spacing between the 2-nd and 3-rd lens units is reduced. During focusing from infinity to a short object distance at, at least, the wide end, the negative and positive sub-lens units in the 2-nd lens unit are moved toward the object side with the spacing therebetween gradually enlarged.

In addition, the present invention provides a zoom lens system including, in order from the object side, a 1-st lens unit having positive power as a whole, a 2-nd lens unit having a negative sub-lens unit disposed on the image side of the 1-st lens unit with an aperture stop interposed therebetween, and a positive sub-lens unit disposed on the image side of the negative sub-lens unit, the 2-nd lens unit having positive power as a whole, and a 3-rd lens unit disposed on the image side of the 2-nd lens unit and having negative power as a whole. During zooming from the wide end toward the tele end, the 1-st, 2-nd and 3-rd lens units are each moved toward the object side, while the spacing between the negative and positive sub-lens units in the 2-nd lens unit is held constant. During focusing from infinity to a short object distance at, at least, the wide end, the negative and positive sub-lens units in the 2-nd lens unit are moved toward the object side with the spacing therebetween gradually enlarged.

In addition, the present invention provides a zoom lens system including, in order from the object side, a 1-st lens unit having positive power as a whole, a 2-nd lens unit having a negative sub-lens unit disposed on the image side of the 1-st lens unit, and a positive sub-lens unit disposed on the image side of the negative sub-lens unit with an aperture stop interposed therebetween, the 2-nd lens unit having positive power as a whole, and a 3-rd lens unit disposed on the image side of the 2-nd lens unit and having negative power as a whole. During zooming from the wide end toward the tele end, the 1-st, 2-nd and 3-rd lens units are each moved toward the object side, while the spacing between the negative and positive sub-lens units in the 2-nd lens unit is held constant. During focusing from infinity to a short object distance at, at least, the wide end, the negative and positive sub-lens units in the 2-nd lens unit are moved toward the object side with the spacing therebetween gradually enlarged.

In addition, the present invention provides zoom lens system including, in order from the object side, a 1-st lens unit having positive power as a whole, a 2-nd lens unit having a negative sub-lens unit disposed on the image side of the 1-st lens unit, and a positive sub-lens unit disposed on the image side of the negative sub-lens unit, the 2-nd lens unit having positive power as a whole, and a 3-rd lens unit disposed on the image side of the 2-nd lens unit and having negative power as a whole. During zooming from the wide end toward the tele end, the 1-st, 2-nd and 3-rd lens units are each moved toward the object side, while the spacing between the negative and positive sub-lens units in the 2-nd lens unit is held constant. During focusing from infinity to a short object distance at, at least, the wide end, the negative and positive sub-lens units in the 2-nd lens unit are moved toward the object side with the spacing therebetween gradually enlarged.

The reason for adopting the above-described arrangements in the present invention and the functions thereof will be described below.

As shown in FIG. 1, the zoom lens system of the present invention includes, in order from the object side, a 1-st lens unit G1 of positive power, a 2-nd lens unit G2 of positive power, and a 3-rd lens unit G3 of negative power. Zooming from the wide end toward the tele end is effected by increasing the spacing between the 1-st lens unit G1 and the 2-nd lens unit G2 while reducing the spacing between the 2-nd lens unit G2 and the 3-rd lens unit G3.

The 2-nd lens unit G2 of positive power is composed, in order from the object side, of a negative sub-lens unit G2N and a positive sub-lens unit G2P, and an aperture stop is disposed between the 1-st lens unit G1 and the 2-nd lens unit G2, as shown by reference symbol S', or between the negative sub-lens unit G2N and the positive sub-lens unit G2P, as shown by reference symbol S. When focusing is to be effected on an object at a short distance at, at least, the wide end, the negative sub-lens unit G2N and the positive sub-lens unit G2P are simultaneously moved toward the object side in parallel to the optical axis with the spacing therebetween gradually enlarged.

Further, the zoom lens system satisfies the following conditions (1) and (2):

$$-(1+4\phi_1/\phi_2)<\phi_{2N}/\phi_2 \times \phi_{2P}/\phi_2 \quad (1)$$

$$0.8<|\phi/\phi_w|<2.0 \quad (2)$$

where $\phi_1$: the power of the 1-st lens unit G1;

$\phi_2$: the power of the 2-nd lens unit G2;

$\phi_3$: the power of the 3-rd lens unit G3;

$\phi_{2N}$: the power of the negative sub-lens unit G2N in the 2-nd lens unit G2;

$\phi_{2P}$: the power of the positive sub-lens unit G2P in the 2-nd lens unit G2; and $\phi_w$: the reciprocal of the focal length of the entire system at the wide end.

If the aperture stop (S or S') is adapted to move independently of the negative sub-lens unit G2N in the 2-nd lens unit G2, the zoom lens system of the present invention satisfies the following condition (3):

$$0.8<f_w \Sigma^{G2N}_i (N_i'-N_i)/r_i|<2.0 \quad (3)$$

where $\Sigma^{G2N}_i$: summation in the negative sub-lens unit G2N of the 2-nd lens unit G2;

$f_w$: the focal length of the entire zoom lens system at the wide end;

$r_i$: the radius of curvature of the i-th lens surface from the object side in the negative sub-lens unit G2N of the 2-nd lens unit G2;

$N_i$: the refractive index at the object side of the i-th lens surface from the object side in the negative sub-lens unit G2N of the 2-nd lens unit G2; and $N_i'$: the refractive index at the image side of the i-th lens surface from the object side in the negative sub-lens unit G2N of the 2-nd lens unit G2.

If the aperture stop (S or S') is adapted to move together with the negative sub-lens unit G2N in the 2-nd lens unit G2 as one unit, the zoom lens system of the present invention satisfies the following condition (4):

$$-3.0<f_w \Sigma^{G2P}_j (N_j'-N_j)/r_j|<-0.3 \quad (4)$$

where $\Sigma^{G2P}_j$: summation in the positive sub-lens unit G2P of the 2-nd lens unit G2;

$f_w$: the focal length of the entire zoom lens system at the wide end;

$r_j$: the radius of curvature of the j-th lens surface from the object side in the positive sub-lens unit G2P of the 2-nd lens unit G2;

$N_j$: the refractive index at the object side of the j-th lens surface from the object side in the positive sub-lens unit G2P of the 2-nd lens unit G2; and $N_j'$: the refractive index at the image side of the j-th lens surface from the object side in the positive sub-lens unit G2P of the 2-nd lens unit G2.

Further, the zoom lens system of the present invention uses at least one aspherical surface in the 2-nd lens unit G2.

Further, the zoom lens system of the present invention uses at least one aspherical surface in the positive sub-lens unit G2P of the 2-nd lens unit G2 and satisfies the following condition (5) when the aspherical surface is expressed by the following formula (I):

$$-3.0<(N'-N)Ef_w^3<-0.7 \quad (5)$$

where

N: the refractive index at the object side of the aspherical surface in the positive sub-lens unit G2P of the 2-nd lens unit G2;

N': the refractive index at the image side of the aspherical surface in the positive sub-lens unit G2P of the 2-nd lens unit G2; and E: the coefficient of the quartic term when the aspherical surface is expressed by $$Z=h^2/\{R_0+R_0[1-P(h/R_0)^2]^{1/2}\}+Eh^4+Fh^6+Gh^8+Hh^{10} \quad (I)$$

(where Z represents the configuration of an aspherical surface having a vertex of curvature radius $R_0$ at a point at distance h from the optical axis).

As shown in FIG. 2, when focusing is effected on an object at a short distance by using the 2-nd lens unit G2 of positive power in the present invention, the 2-nd lens unit G2 moves toward the object side, as shown by the broken line. In FIG. 2, reference symbol I denotes a film plane. At this time, an off-axis ray $R_C$ from the object at a short distance is incident on the 2-nd lens unit G2 at an angle $\underline{\alpha}_C$, which is smaller than the angle $\underline{\alpha}$ of incidence of an off-axis ray $R_\infty$ when the system is focused on an object at infinity, i.e., $|\underline{\alpha}_C|<\underline{\alpha}_\infty|$. It is well known that III, which expresses astigmatism by third-order aberration coefficient, is given by $$III=\Sigma(\underline{h}N/r-\underline{\alpha})^2 h(\alpha'/N'^2-\alpha/N^2) \quad (a)$$

In the above expression, symbols are used in the same way as in Yoshiya Matsui "Aberration Theory". In the present application, however, underlines are used in place of the lines which are drawn above symbols such as α, h, etc. to express paraxial quantity.

In the zoom lens system of the present invention, the overall III in the 2-nd lens unit G2 becomes negative to balance with those of the 1-st and 3-rd lens units G1 and G3, thereby correcting the image surface. Further, $\underline{\alpha}$ is approximately equal to −1. Accordingly, when the system is focused on an object at a short distance, $|\underline{\alpha}|$ becomes small. As a result, the overall |III| in the 2-nd lens unit G2 becomes small, as will be understood from the expression (a). Consequently, the image surface bows toward the under side.

Accordingly, in the present invention, the 2-nd lens unit G2 of positive power is divided into a negative sub-lens unit G2N and a positive sub-lens unit G2P, which are disposed in the mentioned order from the object side, as shown in FIG. 3, and an aperture stop S is disposed between the 1-st lens unit G1 and the 2-nd lens unit G2 (see FIG. 3(b)) in or between the negative sub-lens unit G2N and the positive sub-lens unit G2P (see FIG. 3(a)). When focusing is effected at, at least, the wide end, the negative sub-lens unit G2N and the positive sub-lens unit G2P are moved toward the object side with the spacing therebetween gradually enlarged, thereby controlling the height $h$ of the incident off-axis ray in the above expression (a), and thus preventing |III| in the 2-nd lens unit G2 from becoming small and hence preventing the image surface from bowing toward the under side. In FIG. 3(a) $h$ is the height at which Rc (the short-distance off-axis ray) passes through G2N when focusing is effected according to the present invention. $ho$ is the height at which Rc passes through G2N when focusing is effected by moving lens components of second lens unit together as one unit. In FIG. 3(b), $h'$ is the height at which Rc passes through G2P when focusing is effected according to the present invention. $h'o$ is the height at which Rco passes through G2P when focusing is effected by moving lens components of second lens unit together as one unit.

Further, the zoom lens system of the present invention adopts an arrangement wherein the 1-st lens unit G1 is positive, the 2-nd lens unit G2 is positive, and the 3-rd lens unit G3 is negative, and wherein during zooming from the wide end toward the tele end, the spacing between the 1-st and 2-nd lens units G1 and G2 increases, while the spacing between the 2-nd and 3-rd lens units G2 and G3 decreases. With this arrangement, since the axial bundle of rays is approximately parallel to the optical axis in the vicinity of the 2-nd lens unit G2, even when the negative sub-lens unit G2N and the positive sub-lens unit G2P are moved, the influence on spherical aberration is small, so that the variation of spherical aberration caused by focusing becomes extremely small.

To attain the above-described advantageous feature, the power relationship between the negative and positive sub-lens units G2N and G2P is important, as shown in FIG. 4. This will be explained below.

Let us assume that the power of the negative sub-lens unit G2N is $\phi_{2N}$; the power of the positive sub-lens unit G2P is $\phi_{2P}$; the power of the 2-nd lens unit G2 is $\phi_2$; the focal length of the 2-nd lens unit G2 is $f_2$; the power of the 1-st lens unit G1 is $\phi_1$; the position of an image formed by the 1-st lens unit G1 from the positive sub-lens unit G2P is s; the spacing between the negative and positive sub-lens units G2N and G2P is d; and differences in $f_2$, s and d between the conventional focusing system (FIG. 4(a)), in which the lens components of the 2-nd lens unit G2 are moved together as one unit for focusing, and the focusing system of the present invention (FIG. 4(a)) are $\Delta f_2$, $\Delta s$ and $\Delta d$, respectively. On the above assumption, $\Delta s$ and $\Delta f_2$ are given by $$\Delta s = \phi_2/(\phi_2 + 2/s) \times \Delta f_2 \quad (b)$$

$$\Delta f_2 = (\phi_{2N}\phi_{2P})/\phi_2^2 \times \Delta d \quad (c)$$

Assuming that $s \approx 0.5/\phi_1$, the expression (b) may be changed as follows:

$$\Delta s = \phi_2/(\phi_2 + 4\phi_1) \times \Delta f_2 \quad (b')$$

From the expressions (b') and (c), $$\Delta s = \phi_2/(\phi_2 + 4\phi_1) \times (\phi_{2N}\phi_{2P})/\phi_2^2 \times \Delta d \quad (d)$$

Accordingly, for the present invention to be attained, the following condition (e) must hold:

$$\Delta d + \Delta s > 0 \quad (e)$$

Substituting the expression (d) for the condition (e), we obtain the following condition:

$$\Delta d[1 + \phi_2/(\phi_2 + 4\phi_1) \times (\phi_{2N}\phi_{2P})/\phi_2^2] > 0$$

Hence, $$-(1+4\phi_1/\phi_2) < \phi_{2N}\times\phi_{2P}/\phi_2 \quad (1)$$

Thus, it is necessary in the present invention to satisfy the condition (1).

Further, in the present invention, to obtain balance between the suppression of aberration variation and the attainment of compactness of the zoom lens system, the power $\phi_3$ of the 3-rd lens unit G3 is determined so that the following condition (2) is satisfied:

$$0.8 < |\phi_3/\phi_W| < 2.0 \quad (2)$$

If the upper limit of the condition (2) is exceeded, i.e., if $|\phi_3/\phi_W|$ is not smaller than 2.0, the variation of aberration in the 3-rd lens unit G3 becomes excessively large when the system is focused on an object at a short distance, so that the aberration variation cannot be suppressed even by the above-described focusing method. If the lower limit of the condition (2) is not reached, i.e., if $|\phi_3/\phi_W|$ is not larger than 0.8, the amount of movement of the 3-rd lens unit G3 becomes excessively large to obtain the desired zoom ratio, resulting in an increase in the overall size of the zoom lens system.

With a view to enhancing the aberration variation suppressing effect produced by the focusing system of the present invention and enabling the zoom lens system of the present invention to become more compact, $|\phi_3/\phi_W|$ should preferably fall in the range defined by the following condition (2)':

$$1.0 < |\phi_3/\phi_W| < 1.6 \quad (2)'$$

To effectively draw out the image surface variation suppressing effect in the present invention, the following requirements should preferably be satisfied.

The present invention may be arranged in the following two different forms according to the mode of movement of the aperture stop S during focusing: First, when the aperture stop S is adapted to move independently of the negative sub-lens unit G2N during focusing, as shown at (a) in FIG. 3, the negative sub-lens unit G2N, in which the change in h is relatively large, contributes to the suppression of image surface variation. Let us consider the third-order aberration coefficient III of astigmatism, shown in the expression (a). With regard to the factor $h(\alpha'/N'^2 - \alpha/N^2)$, $\alpha'$ and $\alpha$ in the 2-nd lens unit G2 are nearly parallel to the optical axis because of the nature of the axial ray. Accordingly, it may be considered that the sign of the factor is positive for a surface of positive power and negative for a surface of negative power, and the size thereof is approximately constant in the 2-nd lens unit G2. On the other hand, $\alpha$ in the factor $hN/r - \alpha$ may be considered to be approximately $-1$. Therefore, in order to effectively suppress the image surface variation with respect to the change of $h$ in the negative sub-lens unit G2N, 1/r should preferably be made negatively large for a surface of negative power and positively large for a surface of positive power (r is the radius of curvature of the surface concerned). This may be expressed by the following condition (3)

$$0.8 < f_w \Sigma^{G2N}_i (N_i' - N_i)/|r_i| < 2.0 \qquad (3)$$

If the upper limit of the condition (3) is exceeded, i.e., if $f_w \Sigma^{G2N}_i (N_i' - N_i)/|r_i|$ is not smaller than 2.0, the variation of spherical aberration becomes unallowable, although the image surface variation suppressing effect is enhanced. If the lower limit of the condition (3) is not reached, i.e., if $f_w \Sigma^{G2N}_i (N_i' - N_i)/|r_i|$ is not larger than 0.8, the image surface variation suppressing effect becomes excessively weak.

Second, when the aperture stop S is adapted to move together with the negative sub-lens unit G2N as one unit, as shown at (b) in FIG. 3, the positive sub-lens unit G2P contributes to the suppression of the image surface variation. Considering the third-order aberration coefficient III, since the change of $\underline{h}$ is positive, 1/r should preferably be made negatively large for a surface of positive power and positively large for a surface of negative power. This may be expressed by the following condition (4):

$$-3.0 < f_w \Sigma^{G2P}_j (N_j' - N_j)/|r_j| < -0.3 \qquad (4)$$

If the lower limit of the condition (4) is not reached, i.e., if $f_w \Sigma G2P_j (N_j' - N_j)/|r_j|$ is not larger than -3.0, the variation of spherical aberration becomes excessively larger, although the image surface variation suppressing effect is enhanced. If the upper limit of the condition (4) is exceeded, i.e., if $f_w \Sigma^{G2P}_j (N_j' - N_j)/|r_j|$ is not smaller than -0.3, the image surface variation suppressing effect becomes excessively weak.

Further, to effectively draw out the image surface variation suppressing effect in the present invention, it is preferable to use at least one aspherical surface in the 2-nd lens unit G2. The reason for this is that when an aspherical surface is used, $h^2\underline{h}^2\Psi$ (where $\Psi=(N'-N)b$) is added to the expression (a) as an additive term, and thus the third-order aberration coefficient can be controlled by the change of $\underline{h}$.

The aspherical surface is preferably used in the positive sub-lens unit G2P. The reason for this is that in the zoom lens system of the present invention the axial and off-axis bundles of rays are more separate from each other in the positive sub-lens unit G2P than in the negative sub-lens unit G2N, and hence the influence of the aspherical surface on the spherical aberration reduces.

Further, it is preferable for the at least one aspherical surface in the positive sub-lens unit G2P to satisfy the following condition (5):

$$-3.0 < (N'-N)E f_w^3 < -0.7 \qquad (5)$$

The reason for this is that the above-mentioned b becomes $b = E f_w^3$ and $\underline{h}$ increases in the positive direction, and hence the third-order aberration coefficient III is corrected in the negative direction. If the lower limit of the condition (5) is not reached, i.e., if $(N'-N)E f_w^3$ is not larger than -3.0, the distortion correcting effect at the tele end becomes excessively weak, although the image surface variation suppressing effect is enhanced. If the upper limit of the condition (5) is exceeded, i.e., if $(N'-N)E f_w^3$ is not smaller than -0.7, the image surface variation suppressing effect becomes excessively weak.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1 shows a basic arrangement of the zoom lens system according to the present invention and also illustrates a method of moving lens units for zooming and focusing.

FIG. 2 illustrates the behavior of rays in a case where focusing is effected by moving a 2-nd lens unit.

FIG. 4(a) illustrates a focusing method wherein the lens components of the 2-nd lens unit are moved together as one unit FIG. 4(b) illustrates a focusing method wherein the sub-lens units of the 2-nd lens unit are moved independently of each other according to the present invention.

FIG. 5 is a sectional view of Example 1 of the zoom lens system according to the present invention at the wide end.

DESCRIPTION OF THE PREFERRED EMBODIMENTS

Examples 1 to 3 of the zoom lens system according to the present invention will be described below.

Figure 3A:
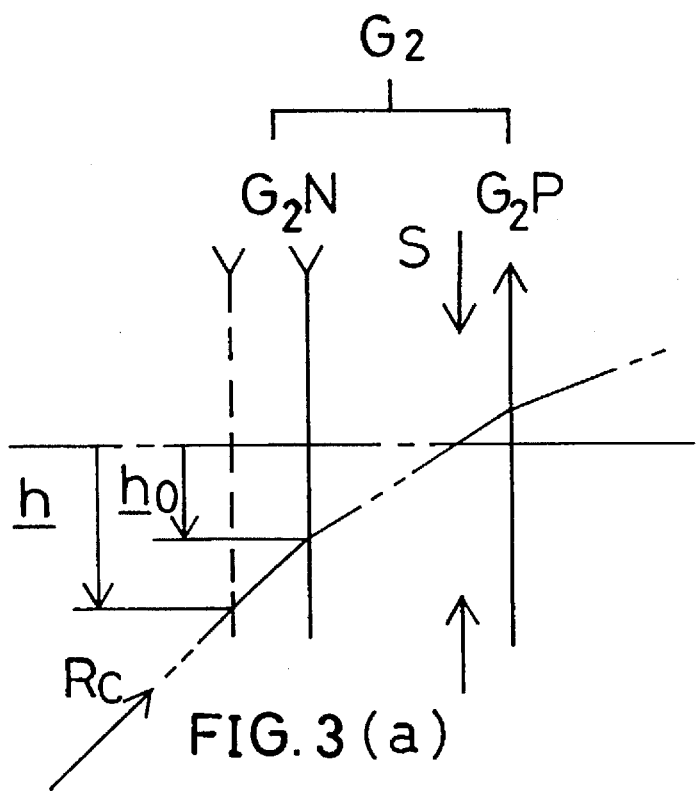
FIG. 3 illustrates the behavior of rays in a case where focusing is effected according to the present invention.
Figure 3B:
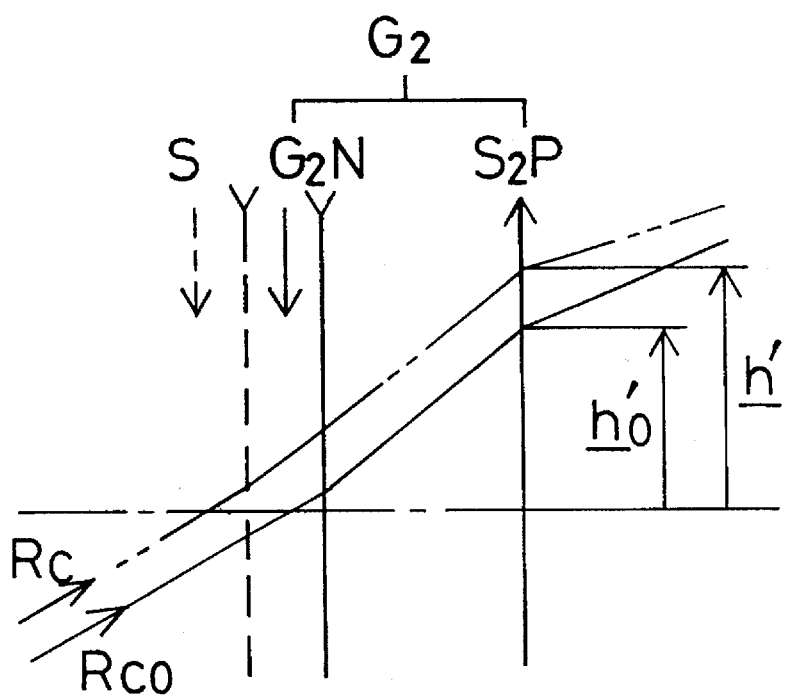
Figure 6:
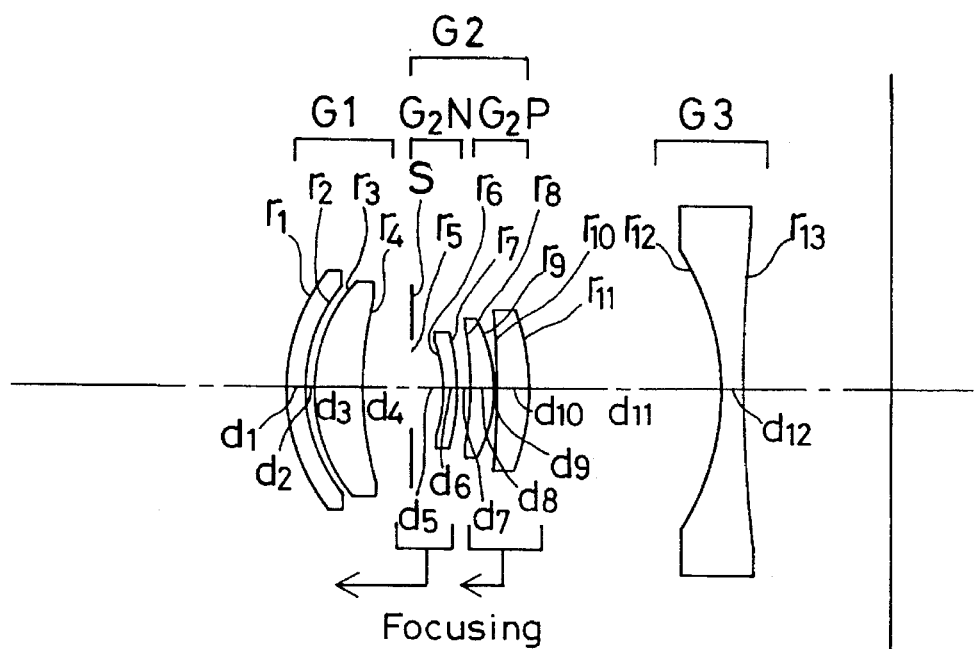
FIG. 6 is a sectional view of Example 2 of the zoom lens system according to the present invention at the wide end.
Figure 7:
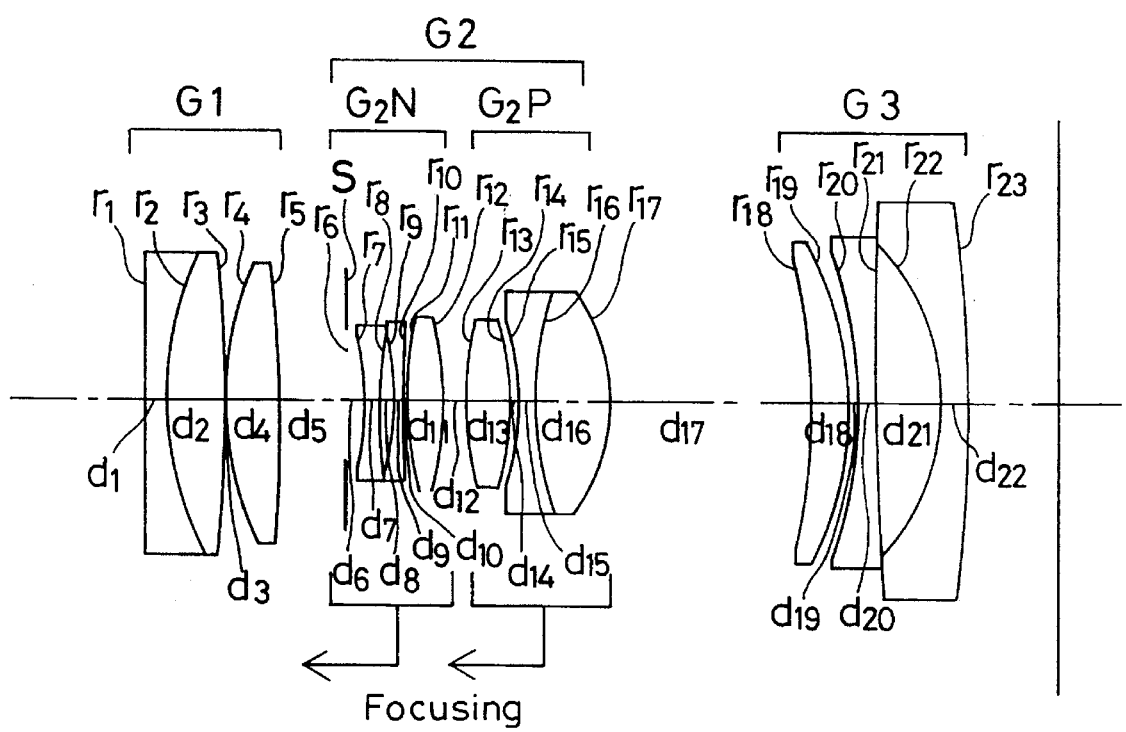
FIG. 7 is a sectional view of Example 3 of the zoom lens system according to the present invention at the wide end.

Lens data in each Example, together with data on focusing, will be described later. FIGS. 5 to 7 are sectional views respectively showing the zoom lens systems of Examples 1 to 3 at the wide end.

As shown in FIG. 5, Example 1 is a zoom lens system having a 1-st lens unit G1 of positive power, a 2-nd lens unit G2 of positive power, and a 3-rd lens unit G3 of negative power. Zooming from the wide end toward the tele end is effected by increasing the spacing between the 1-st lens unit G1 and the 2-nd lens unit G2 while reducing the spacing between the 2-nd lens unit G2 and the 3-rd lens unit G3. The 2-nd lens unit G2 of positive power is composed of a negative sub-lens unit G2N and a positive sub-lens unit G2P, and an aperture stop S is disposed therebetween. With regard to the lens arrangement, the 1-st lens unit G1 is composed of two lens elements, that is, a negative meniscus lens having a convex surface directed toward the object side, and a positive meniscus lens having a convex surface directed toward the object side. The negative sub-lens unit G2N in the 2-nd lens unit G2 is composed of a cemented lens of a biconcave lens and a biconvex lens. The positive sub-lens unit G2P in the 2-nd lens unit G2 is composed of three lens elements, that is, a biconvex lens, a biconcave lens and a biconvex lens. The 3-rd lens unit. G3 is composed of two lens elements, that is, a positive meniscus lens having a convex surface directed toward the image side, and a biconcave lens. Aspherical surfaces are used for the image-side surfaces of the two biconvex lenses in the positive sub-lens unit G2P and for the object-side surface of the biconcave lens in the 3-rd lens unit G3. That is, a total three aspherical surfaces are used in this Example. During focusing, the aperture stop S moves together with the positive sub-lens unit G2P as one unit.

Figure 8:
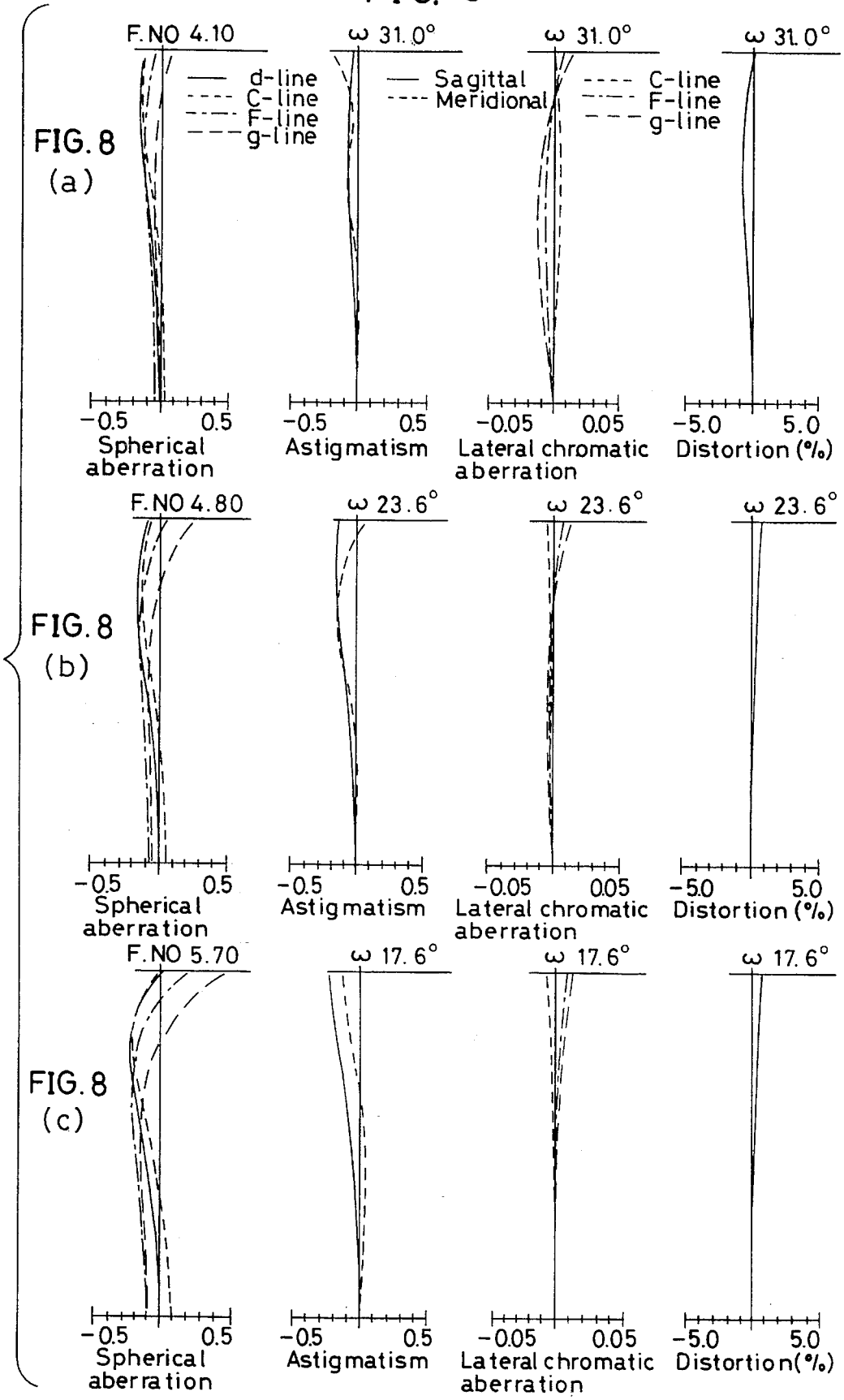
FIGS. 8(a), (b) and (c) graphically show spherical aberration, astigmatism, lateral chromatic aberration and distortion at the wide end (a), the standard position (b), and the tele end (c) in Example 1 when focused on an object at infinity.
Figure 9:
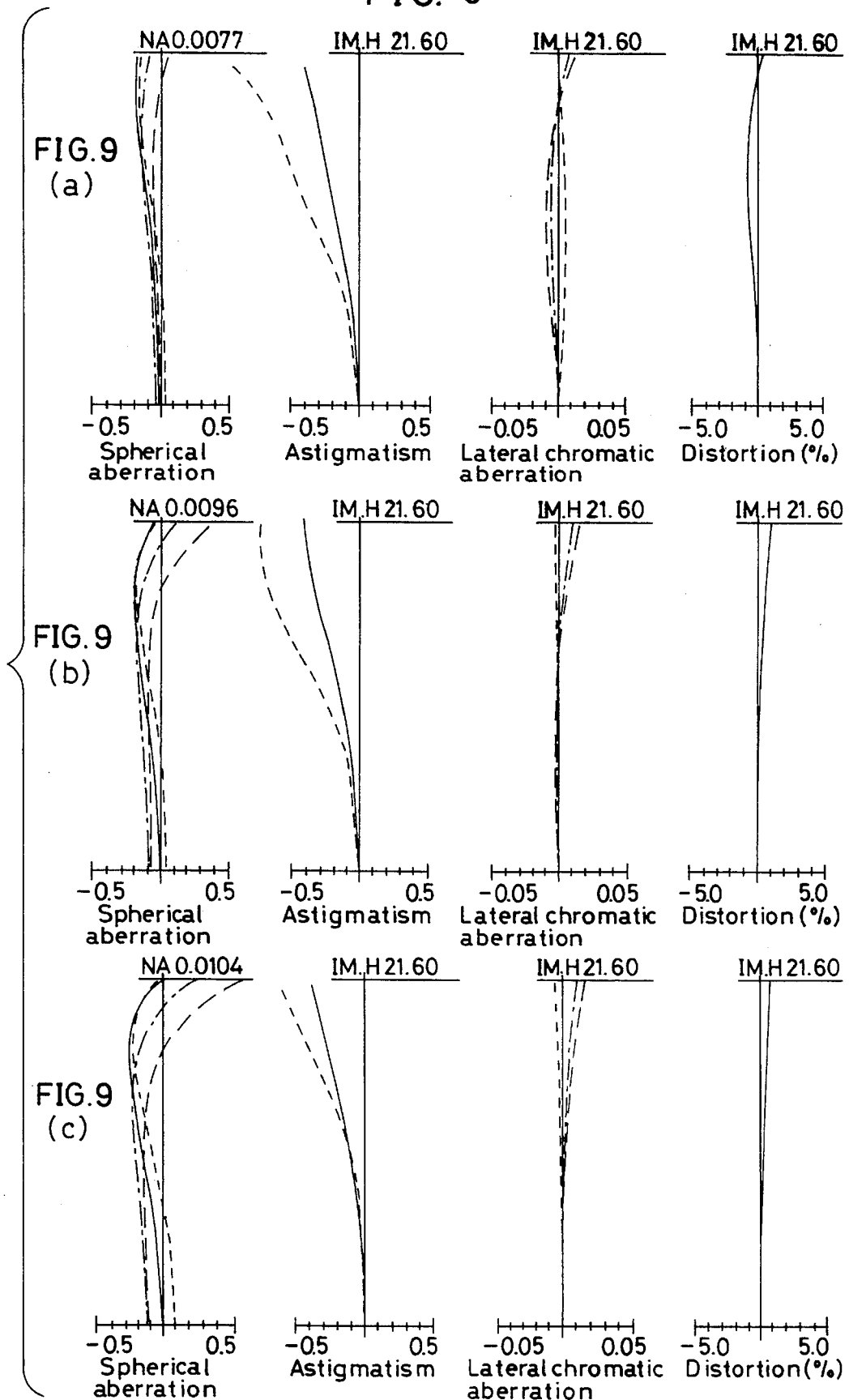
FIGS. 9(a), (b) and (c) graphically show, in a similar manner to FIGS. 8(a), (b) and (c), various aberrations in Example 1 when focused on an object at a distance of 0.6 m by moving the 1-st and 2-nd lens units together as one unit.
Figure 10:
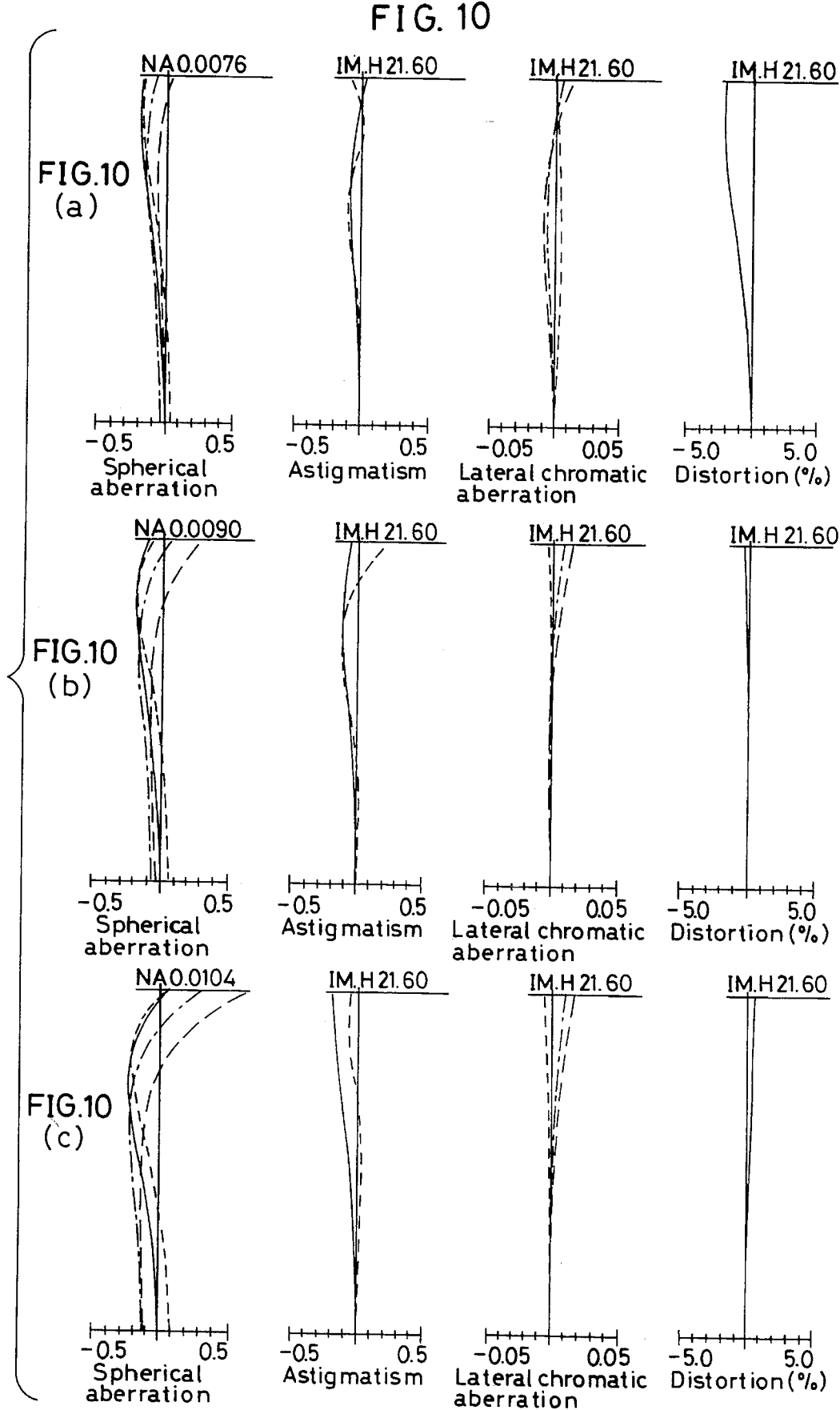
FIGS. 10(a), (b) and (c) graphically show, in a similar manner to FIGS. 8(a), (b) and (c), various aberrations in Example 1 when focused on an object at a distance of 0.6 m by the focusing method of the present invention.

FIGS. 8(a), (b) and (c) graphically show spherical aberration, astigmatism, lateral chromatic aberration and distortion at the wide end (a), the standard position (b), and the tele end (c) in Example 1 when focused on an object at infinity. FIGS. 9(a), (b) and (c) graphically show, in a similar manner to FIGS. 8(a), (b) and (c), various aberrations in Example 1 when focused on an object at an distance of 0.6 m by moving the 1-st and 2-nd lens units G1 and G2 together as one unit. In contrast, FIGS. 10(a), (b) and (c) graphically show, in a similar manner to FIGS. 8(a), (b) and (c), various aberrations in Example 1 when focused on an object at a distance of 0.6 m by the focusing method of the present invention. As will be clear from these aberration graphs, in this Example, the variation of aberrations caused by focusing at a short object distance can be substantially eliminated by using the focusing method of the present invention. Thus, favorable image quality can be obtained over the entire zoom range, from the wide end to the tele end.

As shown in FIG. 6, Example 2 is a zoom lens system having a 1-st lens unit G1 of positive power, a 2-nd lens unit G2 of positive power, and a 3-rd lens unit G3 of negative power. Zooming from the wide end toward the tele end is effected by increasing the spacing between the 1-st lens unit G1 and the 2-nd lens unit G2 while reducing the spacing between the 2-nd lens unit G2 and the 3-rd lens unit G3. The 2-nd lens unit G2 of positive power is composed of a negative sub-lens unit G2N disposed on the image side of an aperture stop S united with it, and a positive sub-lens unit G2P. With regard to the lens arrangement, the 1-st lens unit G1 is composed of two lens components, that is, a negative meniscus lens having a convex surface directed toward the object side, and a positive meniscus lens having a convex surface directed toward the object side. The negative sub-lens unit G2N in the 2-nd lens unit G2 is composed of a single negative meniscus lens having a convex surface directed toward the image side. The positive sub-lens unit G2P in the 2-nd lens unit G2 is composed of two positive meniscus lenses each having a convex surface directed toward the image side. The 3-rd lens unit G3 is composed of a single biconcave lens. In this Example, two aspherical surfaces are used: one for the final surface of the positive sub-lens unit G2P, and the other for the 1-st surface of the 3-rd lens unit G3. During focusing, the aperture stop S moves together with the negative sub-lens unit G2N as one unit.

Figure 11:
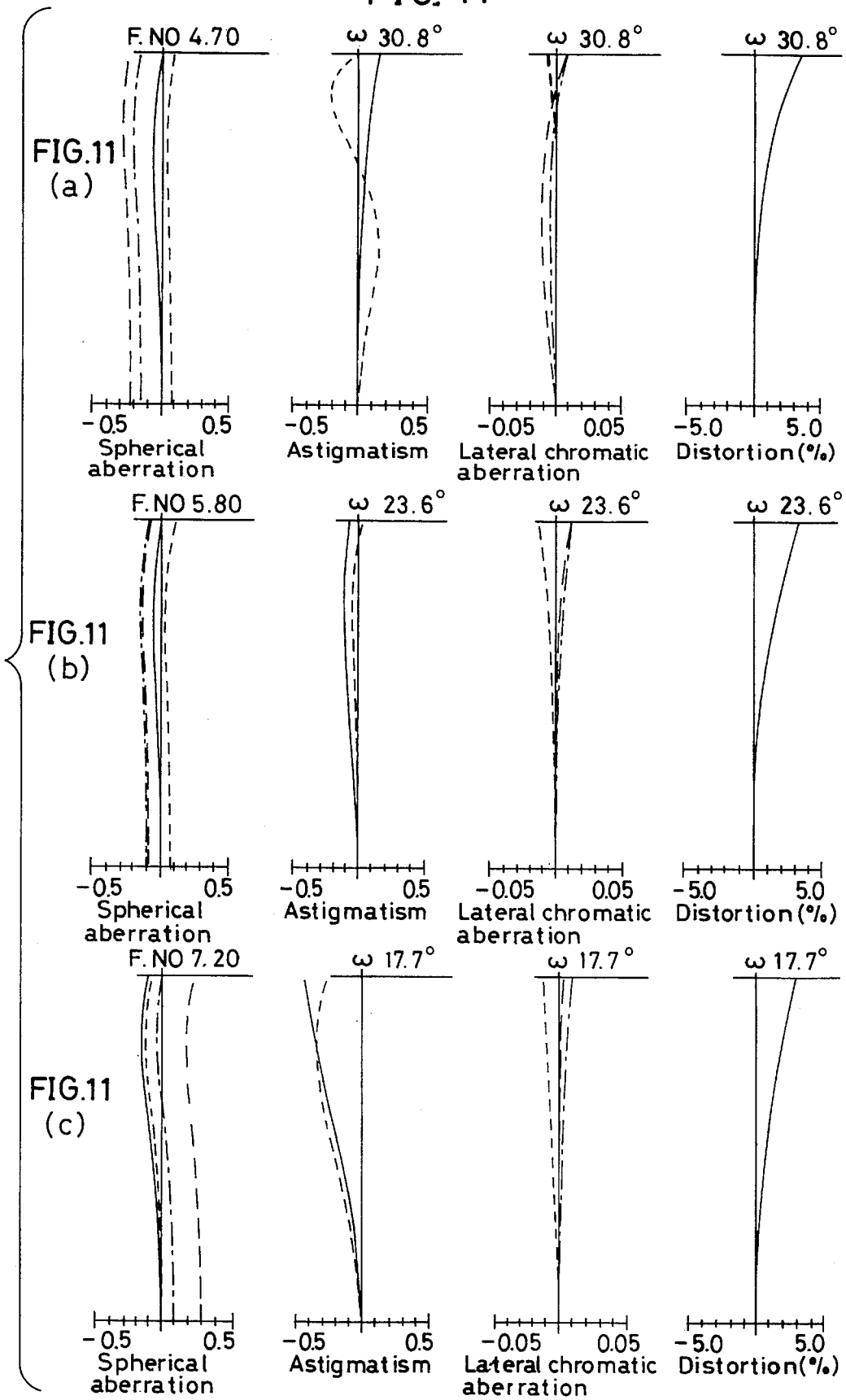
FIGS. 11(a), (b) and (c) graphically show various aberrations in Example 2 in a similar manner to FIGS. 8(a), (b) and (c).
Figure 12:
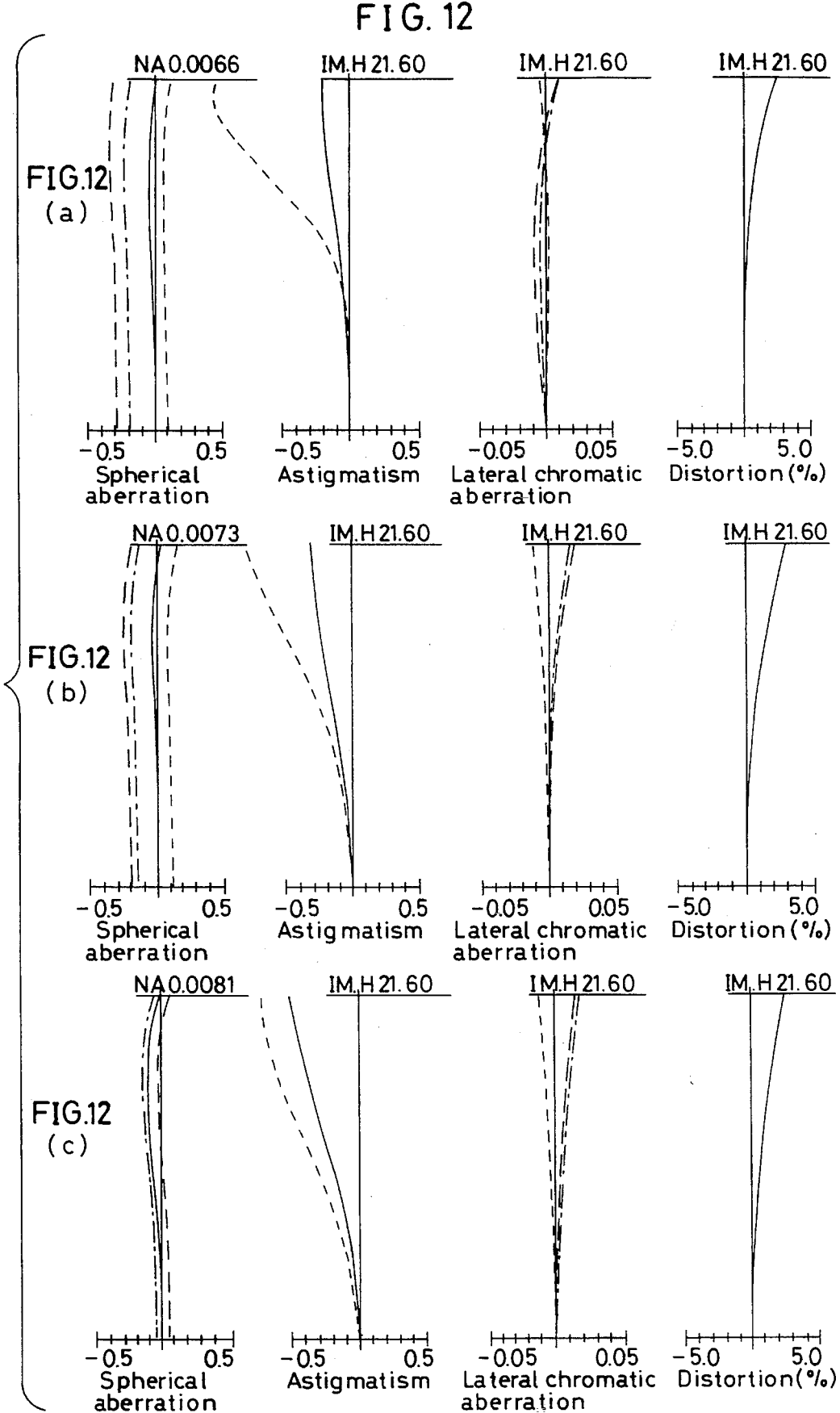
FIGS. 12(a), (b) and (c) graphically show various aberrations in Example 2 in a similar manner to FIGS. 9(a), (b) and (c).
Figure 13:
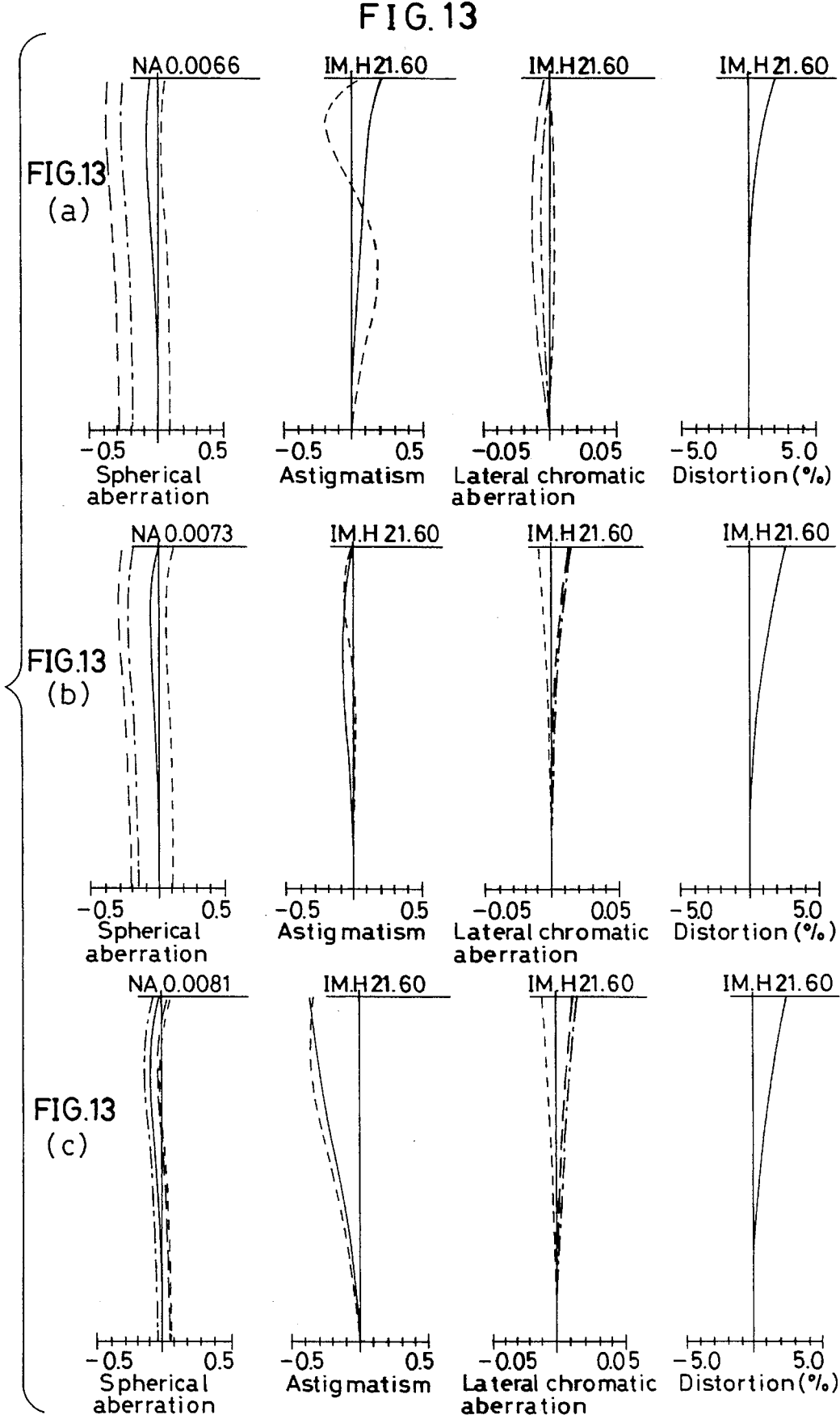
FIGS. 13(a), (b) and (c) graphically show various aberrations in Example 2 in a similar manner to FIGS. 10(a), (b) and (c).

FIGS. 11(a), (b) and (c) graphically show, in a similar manner to FIGS. 8(a), (b) and (c), various aberrations in Example 2 when focused on an object at infinity. FIGS. 12(a), (b) and (c) graphically show, in a similar manner to FIGS. 11(a), (b) and (c), various aberrations in Example 2 when focused on an object at a distance of 0.6 m by moving the 1-st lens unit G1 and the 2-nd lens unit G2 together as one unit. In contrast, FIGS. 13(a), (b) and (c) graphically show, in a similar manner to FIGS. 11(a), (b) and (c), various aberrations in Example 2 when focused on an object at a distance of 0.6 m by the focusing method of the present invention. As will be clear from these aberration graphs, in this Example, the variation of aberrations caused by focusing at a short object distance can be substantially eliminated by using the focusing method of the present invention. Thus, favorable image quality can be obtained over the entire zoom range, from the wide end to the tele end.

As shown in FIG. 7, Example 3 is a zoom lens system having a 1-st lens unit G1 of positive power, a 2-nd lens unit G2 of positive power, and a 3-rd lens unit G3 of negative power. Zooming from the wide end toward the tele end is effected by increasing the spacing between the 1-st lens unit G1 and the 2-nd lens unit G2 while reducing the spacing between the 2-nd lens unit G2 and the 3-rd lens unit G3. The 2-nd lens unit G2 of positive power is composed of a negative sub-lens unit G2N disposed on the image side of an aperture stop S united with it, and a positive sub-lens unit G2P. With regard to the lens arrangement, the 1-st lens unit G1 is composed of a total of three lens elements, that is, a cemented lens of a planoconcave lens and a biconvex lens, and a biconvex lens. The negative sub-lens unit G2N in the 2-nd lens unit G2 is composed of a total of three lens elements, that is, two biconcave lenses, and a biconvex lens. The positive sub-lens unit G2P in the 2-nd lens unit G2 is composed of a total of three lens elements, that is, a biconvex lens, and a cemented lens of a biconcave lens and a biconvex lens. The 3-rd lens unit G3 is composed of a total of three lens elements, that is, a positive meniscus lens having a convex surface directed toward the image side, and two negative meniscus lenses each having a convex surface directed toward the image side. In this Example, an aspherical surface is used for the image-side surface of the object-side biconvex lens in the positive sub-lens unit G2P. During focusing, the aperture stop S moves together with the negative sub-lens unit G2N as one unit.

Figure 14:
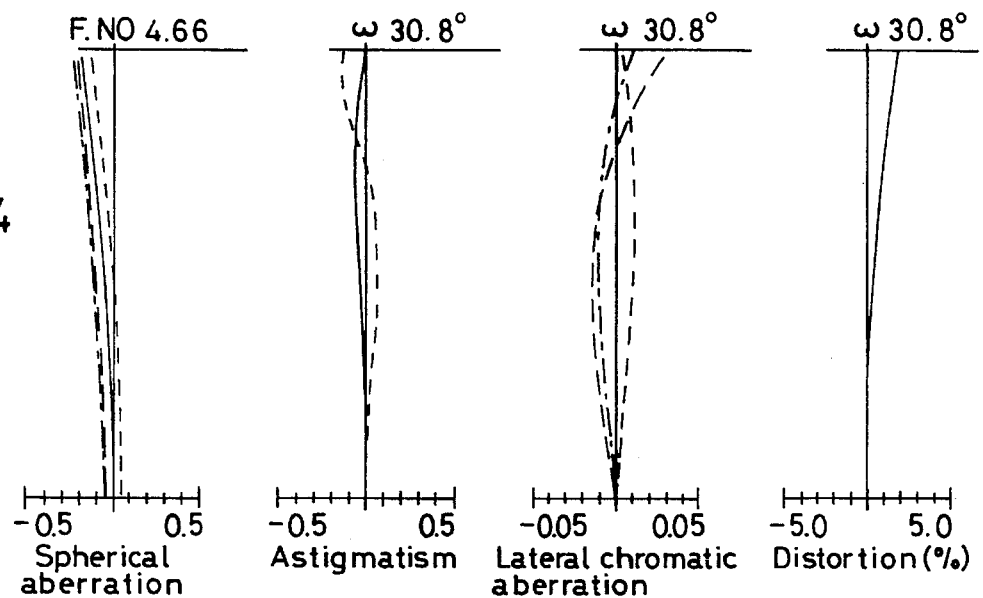
FIG. 14 graphically shows spherical aberration, astigmatism, lateral chromatic aberration and distortion at the wide end in Example 3 when focused on an object at infinity.
Figure 15:
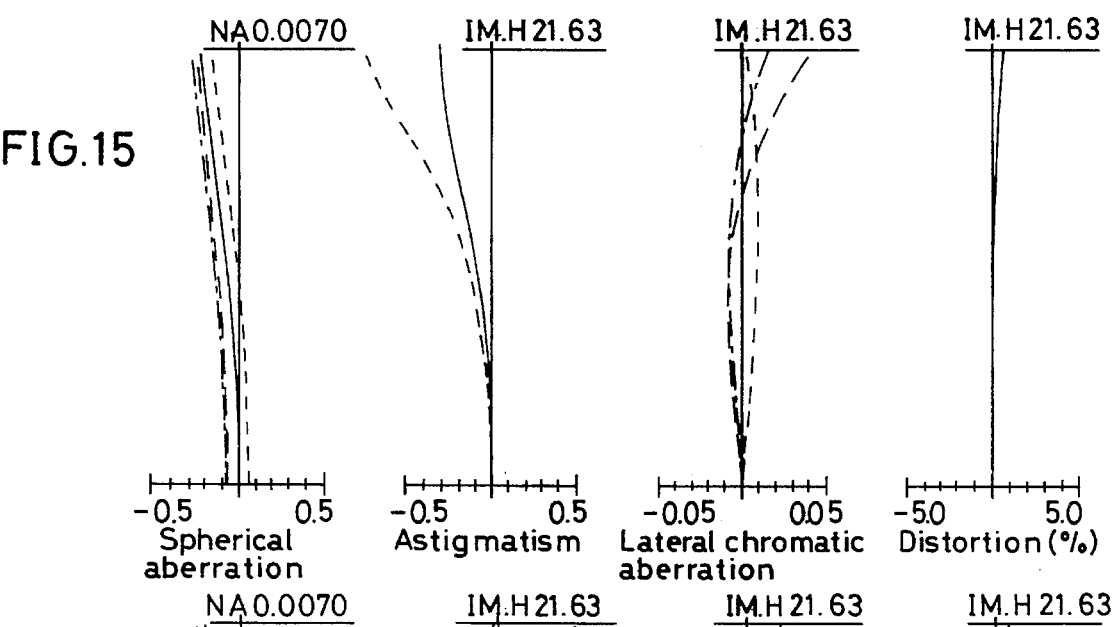
FIG. 15 graphically shows, in a similar manner to FIG. 14, various aberrations in Example 3 when focused on an object at a distance of 0.6 m by moving the 1-st and 2-nd lens units together as one unit.
Figure 16:
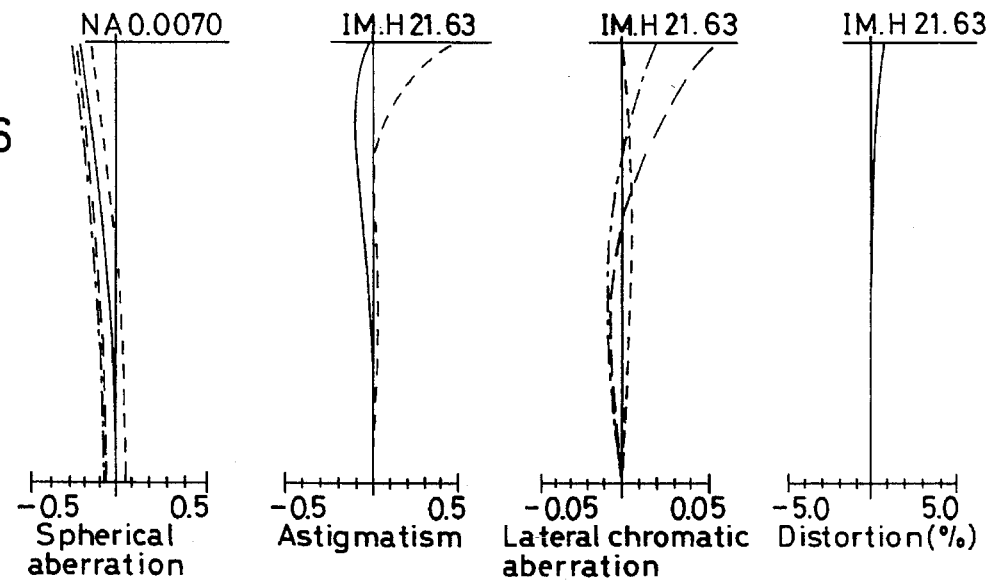
FIG. 16 graphically shows, in a similar manner to FIG. 14, various aberrations in Example 3 when focused on an object at a distance of 0.6 m by the focusing method of the present invention.

FIG. 14 graphically shows spherical aberration, astigmatism, lateral chromatic aberration and distortion at the wide end in Example 3 when focused on an object at infinity. FIG. 15 graphically shows, in a similar manner to FIG. 14, various aberrations in Example 3 when focused on an object at a distance of 0.6 m by moving the 1-st and 2-nd lens units together as one unit. In contract, FIG. 16 graphically shows, in a similar manner to FIG. 14, various aberrations in Example 3 when focused on an object at a distance of 0.6 m by the focusing method of the present invention. In this Example, the variation of various aberrations caused by focusing at a short object distance in the vicinity of the wide end is effectively corrected, although the advantageous effect of the focusing method according to the present invention manifests only in the vicinity of the wide end.

Lens data in each Example will be shown below. In the following, reference symbol f denotes the focal length, $F_{NO}$ is F-number, ω is the half view angle, $f_B$ is the back focus, $r_1, r_2 \ldots$ are the curvature radii of lens surfaces, $d_1, d_2 \ldots$ are the spacings between adjacent lens surfaces, $n_{d1}, n_{d2} \ldots$ are the refractive indices of the lenses for the spectral d-line, and $\nu_{d1}, \nu_{d2} \ldots$ are the Abbe's numbers of the lenses. The aspherical configuration is expressed by $$Z = h^2 / \{R_0 + R_0[1 - P(h/R_0)^2]^{1/2}\} + Eh^4 + Fh^6 + Gh^8 + Hh^{10} \quad (I)$$

where Z represents the configuration of an aspherical surface having a vertex of curvature radius $R_O$ at a point of distance h from the optical axis; P is a conical coefficient; and E, F, G and H aspherical coefficients.

EXAMPLE 1 f = 36.0~49.5~68.0
$F_{NO}$ = 4.1~4.8~5.7
ω = 31.0~23.6~17.6°
$f_B$ = 9.546~22.832~40.598

| | | |
|---|---|---|
| $r_1$ = 31.2168 | $d_1$ = 1.4000 | $n_{d1}$ = 1.72342 $\nu_{d1}$ = 37.95 |
| $r_2$ = 22.7668 | $d_2$ = 0.4000 | |
| $r_3$ = 18.8228 | $d_3$ = 3.5000 | $n_{d2}$ = 1.49700 $\nu_{d2}$ = 81.61 |
| $r_4$ = 53.5197 | $d_4$ = (Variable) | |
| $r_5$ = −23.9579 | $d_5$ = 1.0000 | $n_{d3}$ = 1.71300 $\nu_{d3}$ = 53.84 |
| $r_6$ = 32.6283 | $d_6$ = 2.1289 | $n_{d4}$ = 1.80518 $\nu_{d4}$ = 25.43 |
| $r_7$ = −9717.8768 | $d_7$ = (Variable) | |
| $r_8$ = ∞ (Stop) | $d_8$ = 1.0000 | |
| $r_9$ = 52.3806 | $d_9$ = 2.4000 | $n_{d5}$ = 1.79952 $\nu_{d5}$ = 42.24 |
| $r_{10}$ = −19.8623 (Aspheric) | $d_{10}$ = 1.4198 | |
| $r_{11}$ = −12.6935 | $d_{11}$ = 1.0000 | $n_{d6}$ = 1.76182 $\nu_{d6}$ = 26.55 |
| $r_{12}$ = 174.4327 | $d_{12}$ = 0.7543 | |
| $r_{13}$ = 131.1831 | $d_{13}$ = 3.6899 | $n_{d7}$ = 1.61800 $\nu_{d7}$ = 63.38 |
| $r_{14}$ = −11.5615 (Aspheric) | $d_{14}$ = (Variable) | |
| $r_{15}$ = −34.5181 | $d_{15}$ = 3.0689 | $n_{d8}$ = 1.84666 $\nu_{d8}$ = 23.78 |
| $r_{16}$ = −21.9036 | $d_{16}$ = 2.7527 | |
| $r_{17}$ = −17.8345 (Aspheric) | $d_{17}$ = 1.8000 | $n_{d9}$ = 1.71300 $\nu_{d9}$ = 53.84 |
| $r_{18}$ = 169.4993 | | |

Zooming Spaces

| f | 36.0 | 49.5 | 68.0 |
|---|---|---|---|
| $d_4$ | 4.442 | 11.300 | 16.859 |
| $d_7$ | 1.000 | 1.000 | 1.000 |
| $d_{14}$ | 14.339 | 7.726 | 2.416 |

Focusing Spaces (when the object distans is 0.6 meter)

| f | 36.0 | 49.5 | 68.0 |
|---|---|---|---|
| $d_4$ | 2.192 | 8.928 | 14.552 |
| $d_7$ | 1.934 | 1.797 | 1.431 |
| $d_{14}$ | 15.656 | 9.301 | 4.293 |

Aspherical Coefficients

10th surface

P = 1
E = 0.46754 × $10^{-4}$
F = 0.36325 × $10^{-6}$
G = −0.23252 × $10^{-8}$
H = 0.95961 × $10^{-10}$

14th surface

P = 1
E = 0.25407 × $10^{-4}$
F = −0.94908 × $10^{-7}$
G = 0.49774 × $10^{-8}$
H = −0.35720 × $10^{-10}$

17th surface

P = 1
E = 0.13893 × $10^{-4}$
F = 0.42734 × $10^{-7}$
G = −0.57248 × $10^{-9}$
H = 0.18097 × $10^{-11}$

EXAMPLE 2 f = 36.2~49.5~67.5
$F_{NO}$ = 4.7~5.8~7.2
ω = 30.8~23.6~17.7°
$f_B$ = 9.869~19.397~32.016

| | | |
|---|---|---|
| $r_1$ = 13.4380 | $d_1$ = 1.2000 | $n_1$ = 1.80518 $\nu_{d1}$ = 25.43 |
| $r_2$ = 10.7890 | $d_2$ = 0.5000 | |
| $r_3$ = 10.8170 | $d_3$ = 3.6200 | $n_{d2}$ = 1.48749 $\nu_{d2}$ = 70.20 |
| $r_4$ = 29.7510 | $d_4$ = (Variable) | |
| $r_5$ = ∞ (Stop) | $d_5$ = 2.1000 | |
| $r_6$ = −8.3810 | $d_6$ = 1.0000 | $n_{d3}$ = 1.83400 $\nu_{d3}$ = 37.16 |
| $r_7$ = −13.7200 | $d_7$ = (Variable) | |
| $r_8$ = −30.8720 | $d_8$ = 1.8000 | $n_{d4}$ = 1.51118 $\nu_{d4}$ = 51.02 |
| $r_9$ = −11.1460 | $d_9$ = 0.2000 | |
| $r_{10}$ = −88.0740 | $d_{10}$ = 2.3000 | $n_{d5}$ = 1.51823 $\nu_{d5}$ = 58.96 |
| $r_{11}$ = −14.0840 (Aspheric) | $d_{11}$ = Variable | |
| $r_{12}$ = −14.1910 (Aspheric) | $d_{12}$ = 1.7000 | $n_{d6}$ = 1.56873 $\nu_{d6}$ = 63.16 |
| $r_{13}$ = 209.2770 | | |

Zooming Spaces

| f | 36.2 | 49.5 | 67.5 |
|---|---|---|---|
| $d_4$ | 3.474 | 7.767 | 11.330 |
| $d_7$ | 0.680 | 0.680 | 0.680 |
| $d_{11}$ | 13.426 | 9.133 | 5.570 |

Focusing Spaces (when the object distans is 0.6 meter)

| f | 36.2 | 49.5 | 67.5 |
|---|---|---|---|
| $d_4$ | 1.910 | 6.059 | 9.456 |
| $d_7$ | 0.934 | 0.839 | 0.752 |
| $d_{11}$ | 14.736 | 10.682 | 7.372 |

Aspherical Coefficients

11th surface

P = 1
E = 0.85604 × $10^{-4}$
F = −0.40008 × $10^{-6}$
G = 0.12902 × $10^{-7}$
H = 0

12th surface

P = 1
E = 0.84765 × $10^{-4}$
F = 0.20580 × $10^{-7}$
G = 0.95184 × $10^{-9}$
H = 0

EXAMPLE 3 f = 36.2~60.5~101.3
$F_{NO}$ = 4.7~5.6~6.8
ω = 30.8~19.6~12.0°
$f_B$ = 7.075~24.681~50.868

| | | |
|---|---|---|
| $r_1$ = ∞ | $d_1$ = 1.5800 | $n_{d1}$ = 1.83400 $\nu_{d1}$ = 37.16 |
| $r_2$ = 23.4900 | $d_2$ = 4.5000 | $n_{d2}$ = 1.53172 $\nu_{d2}$ = 48.90 |
| $r_3$ = −319.9980 | $d_3$ = 0.2000 | |
| $r_4$ = 25.9750 | $d_4$ = 4.4000 | $n_{d3}$ = 1.51112 $\nu_{d3}$ = 60.48 |
| $r_5$ = −109.4650 | $d_5$ = (Variable) | |
| $r_6$ = ∞ (Stop) | $d_6$ = 1.2000 | |

-continued

| | | |
|---|---|---|
| $r_7 = -20.9170$ | $d_7 = 1.1000$ | $n_{d4} = 1.72916$ $\nu_{d4} = 54.68$ |
| $r_8 = 46.8120$ | $d_8 = 0.8600$ | |
| $r_9 = -36.3410$ | $d_9 = 1.0400$ | $n_{d5} = 1.72916$ $\nu_{d5} = 54.68$ |
| $r_{10} = 67.5920$ | $d_{10} = 0.2300$ | |
| $r_{11} = 28.8270$ | $d_{11} = 3.0000$ | $n_{d6} = 1.78472$ $\nu_{d6} = 25.68$ |
| $r_{12} = -24.2870$ | $d_{12} = $ (Variable) | |
| $r_{13} = 40.4940$ | $d_{13} = 3.2000$ | $n_{d7} = 1.56384$ $\nu_{d7} = 60.69$ |
| $r_{14} = -22.2260$ (Aspheric) | $d_{14} = 0.8300$ | |
| $r_{15} = -16.0090$ | $d_{15} = 1.2000$ | $n_{d8} = 1.80518$ $\nu_{d8} = 25.43$ |
| $r_{16} = 30.4620$ | $d_{16} = 5.8800$ | $n_{d9} = 1.69680$ $\nu_{d9} = 56.49$ |
| $r_{17} = -14.5440$ | $d_{17} = $ (Variable) | |
| $r_{18} = -57.5720$ | $d_{18} = 3.3800$ | $n_{d10} = 1.78472$ $\nu_{d10} = 25.68$ |
| $r_{19} = -23.5280$ | $d_{19} = 0.4000$ | |
| $r_{20} = -34.8020$ | $d_{20} = 1.6000$ | $n_{d11} = 1.77250$ $\nu_{d11} = 49.66$ |
| $r_{21} = -711.3170$ | $d_{21} = 4.8000$ | |
| $r_{22} = -18.1840$ | $d_{22} = 2.0000$ | $n_{d12} = 1.77250$ $\nu_{d12} = 49.66$ |
| $r_{22} = -127.2820$ | | |

| Zooming Spaces | | | |
|---|---|---|---|
| f | 36.2 | 60.5 | 101.3 |
| $d_5$ | 5.200 | 13.556 | 21.220 |
| $d_{12}$ | 1.650 | 1.650 | 1.650 |
| $d_{17}$ | 14.960 | 7.086 | 1.200 |

Focusing Spaces (when the object distans is 0.6 meter)

| | |
|---|---|
| f | 36.2 |
| $d_5$ | 3.384 |
| $d_{12}$ | 1.897 |
| $d_{17}$ | 16.529 |

Aspherical Coefficients

14th surface $P = 1$
$E = 0.82474 \times 10^{-4}$
$F = 0.29562 \times 10^{-6}$
$G = 0.46595 \times 10^{-9}$
$H = 0.49196 \times 10^{-10}$ Table below shows quantities related to the conditions (1) to (5) in the above Examples 1 to 3.

| | Ex. 1 | Ex. 2 | Ex. 3 |
|---|---|---|---|
| $-(1 + 4\phi_1/\phi_2)$ | -2.081 | -2.981 | -2.691 |
| $\phi_{2N}/\phi_2 \times \phi_{2P}/\phi_2$ | -1.127 | -1.760 | -0.448 |
| $|\phi_3/\phi_W|$ | 1.026 | 1.555 | 1.370 |
| $f_W \Sigma^{G2N}_i (N_i' - N_i)/|r_i|$ | 1.170 | — | 13 |
| $f_W \Sigma^{G2P}_j (N_j' - N_j)/|r_j|$ | — | -2.180 | -0.456 |
| $(N' - N)E f_W^3$ | -1.744 | -2.108 | -2.202 |
| | -0.733 | | |

Figure 17:
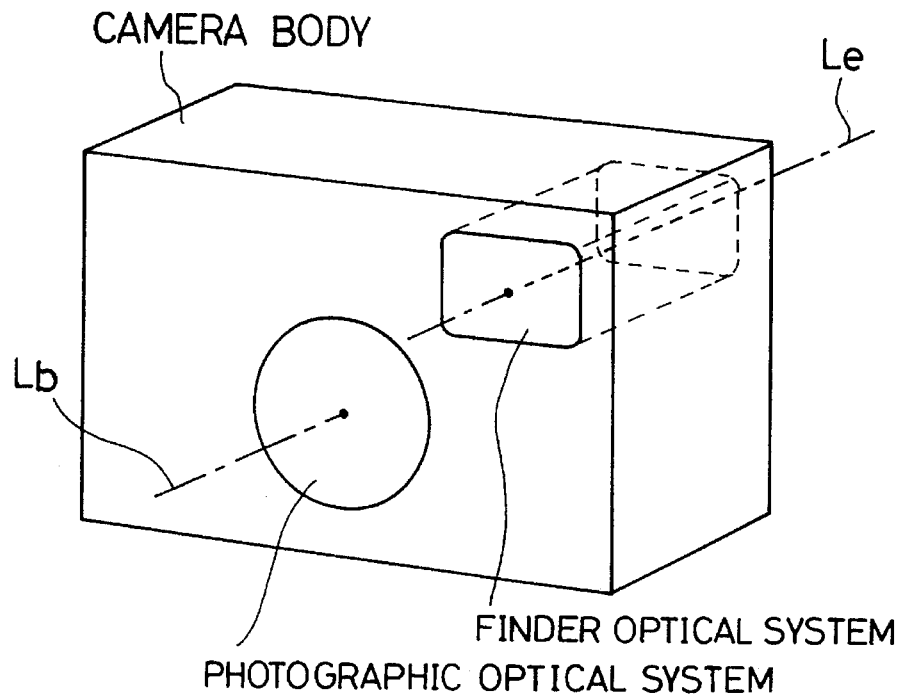
FIG. 17 is a perspective view showing the arrangement of a compact camera.
Figure 18:
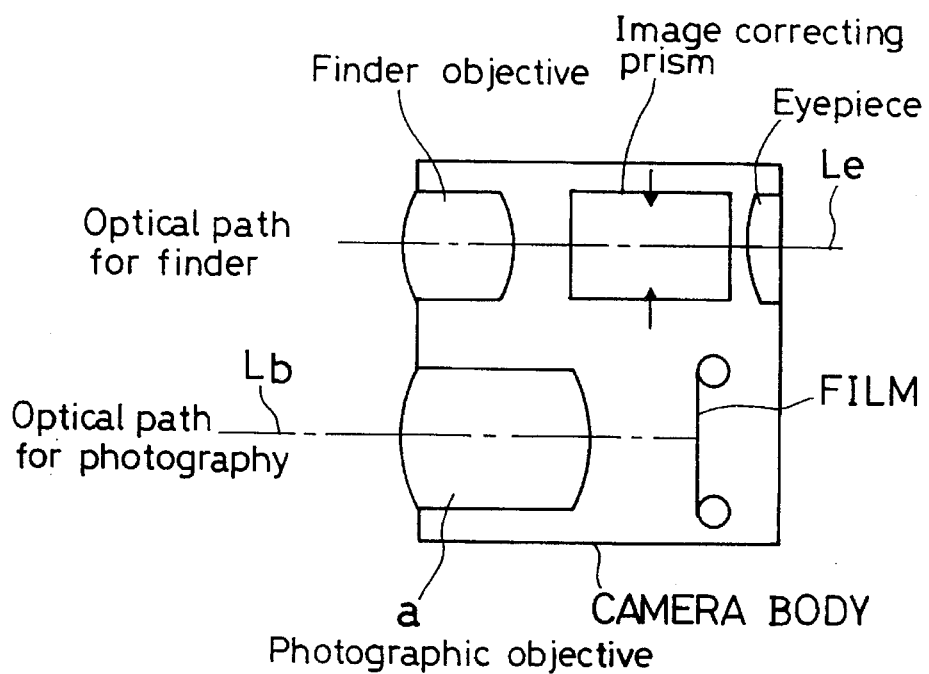
FIG. 18 is a sectional view showing the arrangement of the compact camera.

The zoom lens system of the present invention as described in the foregoing Examples is preferably employed, for example, as a photographic objective a of a compact camera arranged as shown in the perspective view of FIG. 17 and also in the sectional view of FIG. 18. In these figures, $L_b$ denotes an optical path for photography, and $L_e$ an optical path for finder. The two optical paths $L_b$ and $L_e$ lie parallel to each other. An image of an object is observed through a finder that is composed of a finder objective, an image correcting prism, and an eyepiece, and formed on a film by the objective a.

As will be clear from the foregoing description, the present invention makes it possible to construct a compact zoom lens system which is capable of obtaining favorable image quality even at a short object distance.

What we claim is:

1. A zoom lens system comprising, in order from an object side, a 1-st lens unit of positive power, a 2-nd lens unit of positive power, and a 3-rd lens unit of negative power, wherein zooming from a wide end toward a tele end is effected by increasing the spacing between the 1-st and 2-nd lens units while reducing the spacing between the 2-nd and 3-rd lens units, and the 2-nd lens unit of positive power is composed, in order from the object side, of a sub-lens unit of negative power, and a sub-lens unit of positive power, and wherein when focusing is to be effected on an object at a short distance at, at least, the wide end, the sub-lens units of the 2-nd lens unit are simultaneously moved toward the object side in parallel to an optical axis with the spacing between the sub-lens units gradually enlarged, and the following conditions (1) and (2) are satisfied:

$$-(1+4\phi_1/\phi_2) < \phi_{2N}/\phi_2 \times \phi_{2P}/\phi_2 \quad (1)$$

$$0.8 < |\phi_3/\phi_W| < 2.0 \quad (2)$$

where $\phi_1$: the power of the 1-st lens unit;

$\phi_2$: the power of the 2-nd lens unit;

$\phi_3$: the power of the 3-rd lens unit;

$\phi_{2N}$: the power of the negative sub-lens unit in the 2-nd lens unit;

$\phi_{2P}$: the power of the positive sub-lens unit in the 2-nd lens unit; and $\phi_W$: the reciprocal of the focal length of the entire system at the wide end.

2. A zoom lens system according to claim 1, wherein an aperture stop is disposed between said 1-st lens unit and said 2-nd lens unit.

3. A zoom lens system according to claim 1, wherein an aperture stop is disposed between the negative and positive sub-lens units in said 2-nd lens unit.

4. A zoom lens system according to claim 1, wherein during focusing, an aperture stop moves independently of the negative sub-lens unit in the 2-nd lens unit, and the following condition (3) is satisfied:

$$0.8 < f_W \Sigma^{G2N}_i (N_i' - N_i)/|r_i| < 2.0 \quad (3)$$

where $\Sigma^{G2N}_i$: summation in the negative sub-lens unit of the 2-nd lens unit;

$f_W$: the focal length of the entire zoom lens system at the wide end;

$r_i$: the radius of curvature of the i-th lens surface from the object side in the negative sub-lens unit of the 2-nd lens unit;

$N_i$: the refractive index at the object side of the i-th lens surface from the object side in the negative sub-lens unit of the 2-nd lens unit; and $N_i'$: the refractive index at the image side of the i-th lens surface from the object side in the negative sub-lens unit of the 2-nd lens unit.

5. A zoom lens system according to claim 1, wherein during focusing, an aperture stop moves together with the negative sub-lens unit in the 2-nd lens unit as one unit, and the following condition (4) is satisfied:

$$-3.0 < f_W \Sigma^{G2P}_j (N_j' - N_j)/|r_j| < -0.3 \quad (4)$$

where $\Sigma^{G2P}_j$: summation in the positive sub-lens unit of the 2-nd lens unit;

$f_W$: the focal length of the entire zoom lens system at the wide end;

$r_j$: the radius of curvature of the j-th lens surface from the object side in the positive sub-lens unit of the 2-nd lens unit;

$N_j$: the refractive index at the object side of the j-th lens surface from the object side in the positive sub-lens unit of the 2-nd lens unit; and $N_j'$: the refractive index at the image side of the j-th lens surface from the object side in the positive sub-lens unit of the 2-nd lens unit.

6. A zoom lens system according to claim 1, wherein at least one aspherical surface is used in the 2-nd lens unit.

7. A zoom lens system according to claim 1, wherein at least one aspherical surface is used in the positive sub-lens unit of the 2-nd lens unit.

8. A zoom lens system according to claim 7, wherein said at least one aspherical surface satisfies the following condition (5):

$$-3.0 < (N'-N)E f_w^3 < -0.7 \qquad (5)$$

where $N$: the refractive index at the object side of the aspherical surface in the positive sub-lens unit of the 2-nd lens unit;

$N'$: the refractive index at the image side of the aspherical surface in the positive sub-lens unit of the 2-nd lens unit; and $E$: the coefficient of the quartic term when the aspherical surface is expressed by $$Z = h^2/\{R_0 + R_0[1-P(h/R_0)^2]^{1/2}\} + Eh^4 + Fh^6 + Gh^8 + Hh^{10} \qquad (I)$$

(where Z represents the configuration of an aspherical surface having a vertex of curvature radius $R_0$ at a point at distance h from the optical axis).

9. A zoom lens system comprising, in order from an object side, a 1-st lens unit having positive power as a whole, a 2-nd lens unit having a negative sub-lens unit disposed on the image side of said 1-st lens unit with an aperture stop interposed therebetween, and a positive sub-lens unit disposed on the image side of said negative sub-lens unit, said 2-nd lens unit having positive power as a whole, and a 3-rd lens unit disposed on the image side of said 2-nd lens unit and having negative power as a whole, wherein during zooming from a wide end toward a tele end, the spacing between said 1-st and 2-nd lens units is increased, while the spacing between the negative and positive sub-lens units in said 2-nd lens unit is held constant, and the spacing between said 2-nd and 3-rd lens units is reduced, and during focusing from infinity to a short object distance at, at least, the wide end, the negative and positive sub-lens units in said 2-nd lens unit are moved toward the object side with the spacing therebetween gradually enlarged.

10. A zoom lens system comprising, in order from an object side, a 1-st lens unit having positive power as a whole, a 2-nd lens unit having a negative sub-lens unit disposed on the image side of said 1-st lens unit, and a positive sub-lens unit disposed on the image side of said negative sub-lens unit with an aperture stop interposed therebetween, said 2-nd lens unit having positive power as a whole, and a 3-rd lens unit disposed on the image side of said 2-nd lens unit and having negative power as a whole, wherein during zooming from a wide end toward a tele end, the spacing between said 1-st and 2-nd lens units is increased, while the spacing between the negative and positive sub-lens units in said 2-nd lens unit is held constant, and the spacing between said 2-nd and 3-rd lens units is reduced, and during focusing from infinity to a short object distance at, at least, the wide end, the negative and positive sub-lens units in said 2-nd lens unit are moved toward the object side with the spacing therebetween gradually enlarged.

11. A zoom lens system comprising, in order from an object side, a 1-st lens unit having positive power as a whole, a 2-nd lens unit having a negative sub-lens unit disposed on the image side of said 1-st lens unit with an aperture stop interposed therebetween, and a positive sub-lens unit disposed on the image side of said negative sub-lens unit, said 2-nd lens unit having positive power as a whole, and a 3-rd lens unit disposed on the image side of said 2-nd lens unit and having negative power as a whole, wherein during zooming from a wide end toward a tele end, said 1-st, 2-nd and 3-rd lens units are each moved toward the object side, while the spacing between the negative and positive sub-lens units in said 2-nd lens unit is held constant, and during focusing from infinity to a short object distance at, at least, the wide end, the negative and positive sub-lens units in said 2-nd lens unit are moved toward the object side with the spacing therebetween gradually enlarged.

12. A zoom lens system comprising, in order from an object side, a 1-st lens unit having positive power as a whole, a 2-nd lens unit having a negative sub-lens unit disposed on the image side of said 1-st lens unit, and a positive sub-lens unit disposed on the image side of said negative sub-lens unit with an aperture stop interposed therebetween, said 2-nd lens unit having positive power as a whole, and a 3-rd lens unit disposed on the image side of said 2-nd lens unit and having negative power as a whole, wherein during zooming from a wide end toward a tele end, said 1-st, 2-nd and 3-rd lens units are each moved toward the object side, while the spacing between the negative and positive sub-lens units in said 2-nd lens unit is held constant, and during focusing from infinity to a short object distance at, at least, the wide end, the negative and positive sub-lens units in said 2-nd lens unit are moved toward the object side with the spacing therebetween gradually enlarged.

* * * * *